United States Patent
Terenghi

(10) Patent No.: US 10,571,587 B2
(45) Date of Patent: Feb. 25, 2020

(54) WAVEFIELD RECONSTRUCTION

(71) Applicant: PGS Geophysical AS, Oslo (NO)

(72) Inventor: Paolo Terenghi, Weybridge (GB)

(73) Assignee: PGS Geophysical AS, Oslo (NO)

(*) Notice: Subject to any disclaimer, the term of this patent is extended or adjusted under 35 U.S.C. 154(b) by 526 days.

(21) Appl. No.: 15/320,339

(22) PCT Filed: Jun. 24, 2015

(86) PCT No.: PCT/EP2015/064302
§ 371 (c)(1),
(2) Date: Dec. 20, 2016

(87) PCT Pub. No.: WO2016/001041
PCT Pub. Date: Jan. 7, 2016

(65) Prior Publication Data
US 2018/0210104 A1 Jul. 26, 2018

Related U.S. Application Data

(60) Provisional application No. 62/019,563, filed on Jul. 1, 2014.

(51) Int. Cl.
*G01S 1/38* (2006.01)
*G01V 1/38* (2006.01)
*G01V 1/28* (2006.01)

(52) U.S. Cl.
CPC .............. *G01V 1/3808* (2013.01); *G01V 1/28* (2013.01); *G01V 1/3817* (2013.01); *G01V 2210/57* (2013.01); *G01V 2210/675* (2013.01)

(58) Field of Classification Search
USPC .......................................................... 367/15
See application file for complete search history.

(56) References Cited

U.S. PATENT DOCUMENTS

| 7,817,495 | B2 | 10/2010 | Azbek et al. | |
|---|---|---|---|---|
| 9,030,910 | B2* | 5/2015 | Ozbek | G01V 1/364 367/24 |
| 2005/0117451 | A1* | 6/2005 | Robertsson | G01V 1/364 367/24 |
| 2007/0219765 | A1* | 9/2007 | Calvert | G01V 1/282 703/6 |
| 2008/0312878 | A1* | 12/2008 | Robertsson | G01V 1/36 702/189 |
| 2010/0211319 | A1* | 8/2010 | van Manen | G01V 1/364 702/14 |
| 2010/0211321 | A1* | 8/2010 | Ozdemir | G01V 1/364 702/14 |

(Continued)

OTHER PUBLICATIONS

International Preliminary Report on Patentability for related PCT Application PCT/EP2015/064302, dated Jan. 12, 2017 (8 pgs).

(Continued)

*Primary Examiner* — James R Hulka

(57) ABSTRACT

Wavefield reconstruction may include reconstructing a wavefield at a location away from a seismic receiver based on seismic data sampled from the seismic receiver, a vector of model coefficients comprising a scattering potential, and at least one of a mapping matrix comprising a dictionary of Green's functions and an operator defined by a combination of a number of functions.

23 Claims, 5 Drawing Sheets

(56) References Cited

U.S. PATENT DOCUMENTS

| | | | | |
|---|---|---|---|---|
| 2011/0002192 | A1* | 1/2011 | Ozbek | G01V 1/364 367/15 |
| 2011/0242935 | A1* | 10/2011 | Amundsen | G01V 1/284 367/21 |
| 2013/0182536 | A1* | 7/2013 | Vassallo | G01V 1/364 367/24 |
| 2014/0064027 | A1* | 3/2014 | Winnett | G01V 1/364 367/24 |
| 2014/0140171 | A1 | 5/2014 | Sollner | |
| 2014/0334256 | A1* | 11/2014 | Amundsen | G01V 1/284 367/15 |

OTHER PUBLICATIONS

Further Examination Report for related EP Application 15731907.0, dated Jun. 5, 2018 (4 pgs).

International Search Report & Written Opinion for related PCT Application PCT/EP2015/064302, dated Sep. 16, 2015 (12 pgs).

Esmersoy, et al., "Reverse-time wave-field extrapolation, imaging, and inversion"; Geophysics, vol. 53, No. 7, (Jul. 1988) (12 pgs).

Ramirez, et al., "Green's theorem as a comprehensive framework for data reconstruction, regularization, wavefield separation, seismic interferometry, and wavelet estimation: A tutorial"; Geophysics, vol. 74, No. 6, (Nov.-Dec. 2009) (28 pgs).

Trad, "Interpolation and multiple attenuation with migration operators"; Geophysics, vol. 68, No. 6, (Nov.-Dec. 2003) (12 pgs).

Kutscha, "The double focal transformation and its application to data reconstruction"; PhD thesis, Delft University of Technology, The Netherlands, (Jan. 31, 2014) (153 pgs).

Rodriguez, et al., "Microseismic source imaging in a compressed domain"; Geophysics Journal International, vol. 198 (May 22, 2014) (13 pgs).

Rodriguez, et al., "A compressive sensing framework for seismic source parameter estimation"; Geophysics Journal International, vol. 191 (Aug. 22, 2012) (11 pgs).

Kaplan, "Regularized wave equation migration for imaging and data reconstruction"; University of Alberta; (Fall 2010) (229 pgs).

Zhang, et al., "3-D Multi-Valued Seismic Wavefield Reconstruction and Green's Function Computation", Institute of Geology and Geophysics, Chinese Academy of Sciences, Beijing, China, vol. 43, Issue 2 (First Published: Mar. 2000) (1pg, Abstract Only) http://onlinelibrary.wiley.com/doi/10.1002/cjg2.34/abstract.

Chiu, et al., "Applications of 3-D data mapping—azimuth moveout and acquisition-footprint reduction"; SEG International Exposition and 72nd Annual Meeting, Salt Lake City, Utah (Oct. 6-11, 2002) (5 pgs).

Stolt, "Seismic data mapping and reconstruction"; Geophysics, vol. 67, No. 3 (May-Jun. 2002) (19 pgs).

Dedem, et al., "3D surface multiple prediction using sparse inversion"; SEG International Exposition and Annual Meeting, San Antonio, Texas (Sep. 9-14, 2001) (4 pgs).

Weglein, et al.,"Obtaining three-dimensional velocity information directly from reflection seismic data: An inverse scattering formalism"; Geophysics, vol. 46, No. 8 (Aug. 1981) (5 pgs).

Ibrahim, et al., "Simultaneous source separation using a robust Radon transform";Geophysics, vol. 79, No. 1 (Jan.-Feb. 2014) (11 pgs).

Yao, et al., "Estimation of Surface wave Green's Functions from correlation of direct waves coda waves, and ambient noise in SE Tibet"; Physics of the Earth and Planetary Interiors (Jul. 1, 2009) (11 pgs).

Terenghi (Petroleum Geo-Services, Inc.,) "Homogeneous Green's functions as a dictionary for wavefield reconstruction"; (5 pgs).

Dedem, et al., "3D Surface-RelatedMultiple Prediction, an inversion approach"; SEG 2000 Expanded Abstracts, (4 pgs).

Examination Report for related EP Application 15731907.0, dated Feb. 8, 2018 (5 pgs).

1st Mexican Office Action for related Mexican National Phase Application No. MX/A/2017/000132, dated Jul. 10, 2019 (5 pgs total) (Original Copy & English Translation).

* cited by examiner

WAVEFIELD RECONSTRUCTION

CROSS-REFERENCE TO RELATED APPLICATIONS

This application is a National Stage Application under 35 U.S.C. § 371 of International Application No. PCT/EP2015/064302, filed on Jun. 24, 2015 and published as WO 2016/001041 on Jan. 7, 2016, which claims the benefit of U.S. Provisional Application 62/019,563, filed Jul. 1, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine survey vessel tows one or more seismic sources below the surface of the water and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine seismic survey equipment, such as navigation control, seismic source control, seismic receiver control, and recording equipment. The seismic source control may cause the one or more seismic sources, which may be air guns, marine vibrators, etc., to produce acoustic signals at selected times. Each acoustic signal is essentially a sound wave called a wavefield that travels down through the water and into the subterranean formation. At each interface between different types of rock, a portion of the wavefield may be refracted, and another portion may be reflected, which may include some scattering, back toward the body of water to propagate toward the surface. The seismic receivers thereby measure a wavefield that was initiated by the actuation of the seismic source.

DETAILED DESCRIPTION

Figure 1:
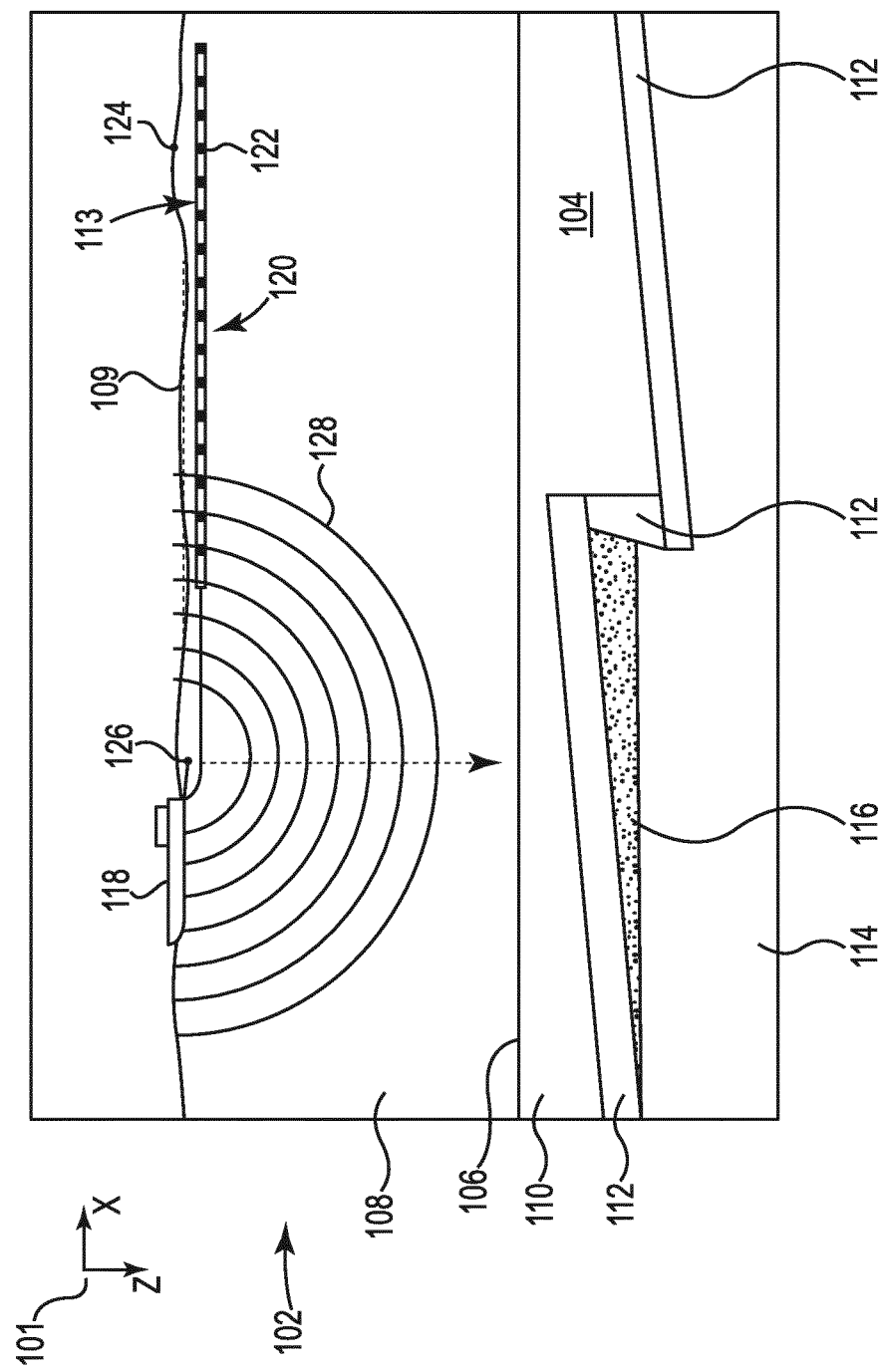
FIG. 1 illustrates an elevation or xz-plane view of marine seismic surveying in which acoustic signals are emitted by a seismic source for recording by seismic receivers for processing and analysis in order to help characterize the structures and distributions of features and materials underlying the solid surface of the earth.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The terms "comprise," "include," and derivations thereof, mean "comprising" or "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein may be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 101 view of marine seismic surveying in which acoustic signals are emitted by a seismic source for recording by seismic receivers for processing and analysis in order to help characterize the structures and distributions of features and materials underlying the solid surface of the earth. FIG. 1 shows a domain volume 102 of the earth's surface comprising a subsurface volume 104 of sediment and rock below the surface 106 of the earth that, in turn, underlies a fluid volume 108 of water having a free surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 210, an uplifted rock layer 112, second, underlying rock layer 114, and hydrocarbon-saturated layer 116.

FIG. 1 shows an example of a marine survey vessel 118 equipped to carry out marine seismic surveys. In particular, the marine survey vessel 118 may tow one or more streamers 120 (shown as one streamers for ease of illustration) generally located below the free surface 109. The streamers 120 may be long cables containing power and data-transmission lines to which seismic receivers may be connected. In one type of marine seismic survey, each seismic receiver, such as the seismic receiver represented by the shaded disk 122 in FIG. 1, comprises two or more seismic receivers including a sensor detecting particle motion, displacement velocity or acceleration, and a hydrophone that detects variations in pressure. The streamers 120 and the marine survey vessel 118 may include sensing electronics and data-processing facilities that allow seismic receiver readings to be correlated with absolute positions on the free surface and absolute three-dimensional (3D) positions with respect to a 3D coordinate system. In FIG. 1, the seismic receivers along the streamers 120 are shown to lie below the free surface 109, with the seismic receiver positions correlated with overlying surface positions, such as a surface position 124 correlated with the position of seismic receiver 122. The marine survey vessel 118 may also tow one or more seismic sources 126 that produce acoustic signals as the marine survey vessel 118 and streamers 120 move along the free surface 109. Seismic sources 126 and/or seismic receivers 122 may also be towed by other vessels, or may be otherwise disposed in fluid volume 108. For example, seismic receivers may be located on ocean bottom cables or nodes fixed at or near the surface 106, and seismic sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to receivers located on a towed streamer, an ocean bottom seismic receiver cable, and/or an array of nodes.

FIG. 1 shows an expanding, spherical acoustic signal, represented by semicircles of increasing radius centered at the seismic source 126, such as semicircle 128, following an acoustic signal emitted by the seismic source 126. The acoustic signals are, in effect, shown in vertical plane cross section in FIG. 1. The outward and downward expanding acoustic signals may eventually reach the surface 106, at which point the outward and downward expanding acoustic signals may partially reflect from the solid surface and may partially refract downward into the solid volume, becoming elastic signals within the solid volume. A portion of the wavefield may eventually return to the surface where it may be detected by the seismic receivers located on the streamers.

Streamers 120 are located a particular distance apart. This distance may be approximately consistent between all adjacent streamers towed by a single vessel, some adjacent streamers, or the distance may be inconsistent among streamers. As used herein, "approximately" may include a distance within a particular margin, range, and/or threshold, for example within a range of −10% to +10%.

Planned or implemented data processing leading to the determination of an image of subterranean structures may require the seismic data to be spatially sampled according to rules of discrete sampling theory. As used herein, seismic data comprises data associated with the wavefield. Sampled seismic data comprises sampled and/or recorded seismic data. Seismic data may be sampled from a seismic receiver located on a streamer, an ocean bottom cable, or a node. Some approaches to seismic exploration may fall short of such rules as data are acquired at spatial locations which are too far apart, both offshore and onshore.

Wavefield measurements from sampled seismic data distributed so far apart as to be insufficient to fulfill discrete sampling theory rules are said to be affected by spatial aliasing. In different but equivalent wording, spatial aliasing occurs where the density of wavefield measurements is insufficient to guarantee a unique reconstruction of the signal in its entire bandwidth. In contrast, wavefield reconstruction in accordance with the present disclosure may reconstruct the wavefield while recovering from spatial aliasing effects. Additionally, it may decompose the wavefield into its upward and downward propagating constituents at the seismic receiver locations. As used herein, a downward propagating constituent comprises a wavefield that is emitted by a seismic source (or a multiple reflection from the free surface 109), and an upward propagating constituent comprises a reflection of a downward propagating constituent. A downward propagating constituent may have downgoing contributions to a wavefield, and an upward propagating constituent may have up-going contributions to a wavefield.

As used herein, "wavefield reconstruction" is the synthesis of new seismic data through the use of available wavefield measurements. In at least one embodiment, reconstruction is the synthesis of new seismic data by interpolation and/or extrapolation of available wavefield measurements. Wavefield reconstruction includes new data synthesized at a location of the available wavefield measurements and/or data in new locations. In at least one embodiment, interpolation includes new locations only, but other embodiments are not so limited. In one embodiment, extrapolation occurs when wavefield reconstruction factually extends the aperture of the measurements, as opposed to increasing measurement density.

While the distance between seismic receivers located on the same streamer is typically short enough to avoid spatial aliasing, the distance between two streamers may be several times wider. In some examples, streamers 120 may be located approximately 100 meters apart. However, it may be desired to have wavefield information associated with seismic receivers located at closer distances than 100 meters, for example, 6 to 12 meters. However, these smaller distances may not be practical due to cost constraints and streamer entanglement issues, among other reasons. Streamers 120 may be separated by greater or smaller distances than 100 meters, and greater or smaller distances than 6 to 12 meters may be desired, in some instances. These closer distances may result in more accurate seismic data processing. For instance, it may be desired for the seismic receivers to be separated by a distance small enough such that spatial aliasing may be avoided. In an example embodiment of the present disclosure, one or more virtual cables may be created such that they are located between streamers 120. As used herein, a virtual cable is a seismic receiver array that is simulated. The virtual cable may be a linear array of seismic receivers that follows either a straight or curved line, as would a physical cable on which physical seismic receivers are located. The virtual cable, as used herein, does not physically exist and does not contain physical seismic receivers. In some embodiments, the deemed location of the virtual cable may overlap one or more physical seismic receiver locations. The wavefield measured at locations of existing seismic receivers and/or newly simulated virtual cables may be decomposed into upward and downward propagating constituents. Alternatively, the wavefield may be reconstructed and decomposed at entirely new locations, such as on a uniform grid. As used herein, decomposing of the wavefield comprises separating a wavefield into its upward and downward propagating constituents.

Wavefield reconstruction techniques in accordance with the present disclosure may be invoked to determine a wavefield at spatial locations where no direct measurement was performed, for example, in order to achieve a particular measurement density. Wavefield reconstruction may therefore be seen as the creation of new data by interpolation or extrapolation of available wavefield measurements in order to fulfill rules of discrete sampling theory. For instance, with respect to interpolation, synthetic measurements may be reconstructed for locations inside an area covered by available wavefield measurements. This area may be restricted to only available wavefield measurements locations. With respect to extrapolation, synthetic measurements may be reconstructed at locations outside an area covered by available wavefield measurements, meaning outside the available wavefield measurements locations. In other embodiments, synthetic measurements may be reconstructed at available wavefield measurements locations, meaning at locations where wavefield measurements were originally sampled. Reconstruction of synthetic measurements, as used herein, includes creation of new data, as noted, using interpolation or extrapolation, among others.

Wavefield reconstruction techniques in accordance with the present disclosure may also be invoked to reconstruct the wavefield at the available wavefield measurements locations, with the intent of removing incoherent noise and/or disturbances which may affect the measurements.

A wavefield may be reconstructed using data measured by a plurality of seismic receivers in response to an acoustic signal produced by one or more seismic sources.

The wavefield may be measured in terms of seismic data representing a variety of physical properties including pressure, pressure's spatial gradients, particle velocity, and/or acceleration (measurement components). The relationship between these physical properties' quantities may be established by the laws of continuum mechanics and equations of motion. Information contained in measured components may be jointly utilized to perform wavefield reconstruction and decomposition.

Reconstruction and decomposition of the wavefield in accordance with the present disclosure may include spectral analysis and wavefield synthesis. As used herein, the spectral analysis may include spectral estimation. During the spectral analysis, available wavefield measurements of the above-specified physical properties may be mapped into a common spectral domain described as a scattering potential. In one or more embodiments, the scattering potential may be described as a temporal and spatial distribution of sources located in a homogeneous reference medium, such as an equivalent source distribution, such that a wavefield resulting from the actuation of these seismic sources may equivalently describe available wavefield measurements. Mapping seismic data, as used herein, may be described as a decomposition of the wavefield into spherical waves. Mapping seismic data, as used herein, may also be described as a decomposition of the wavefield into a scattering potential. A homogeneous reference medium includes a reference medium having common properties throughout.

Figure 2A:
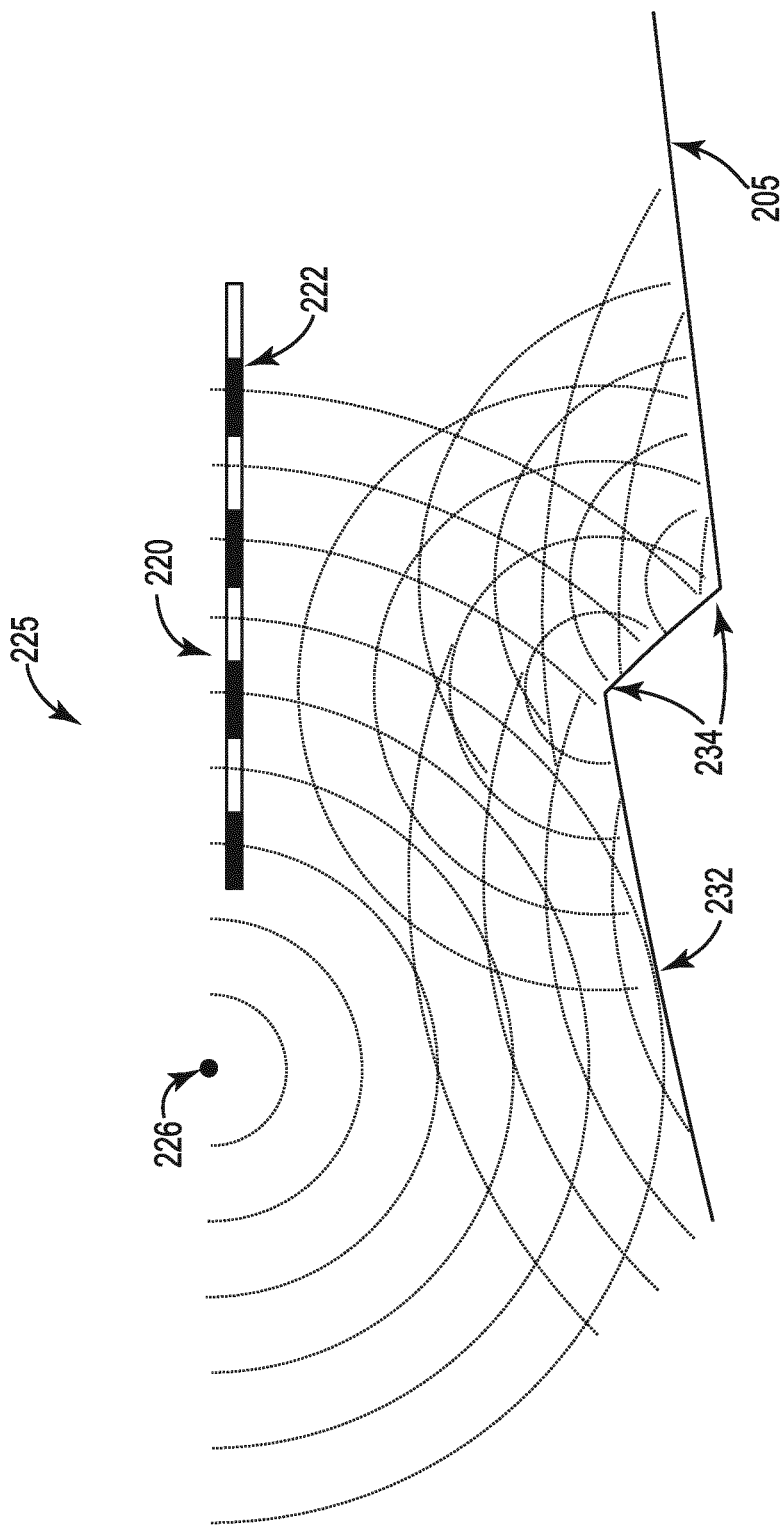
FIGS. 2A-2B illustrate mappings of measured seismic data associated with wavefield reconstruction.
Figure 2B:
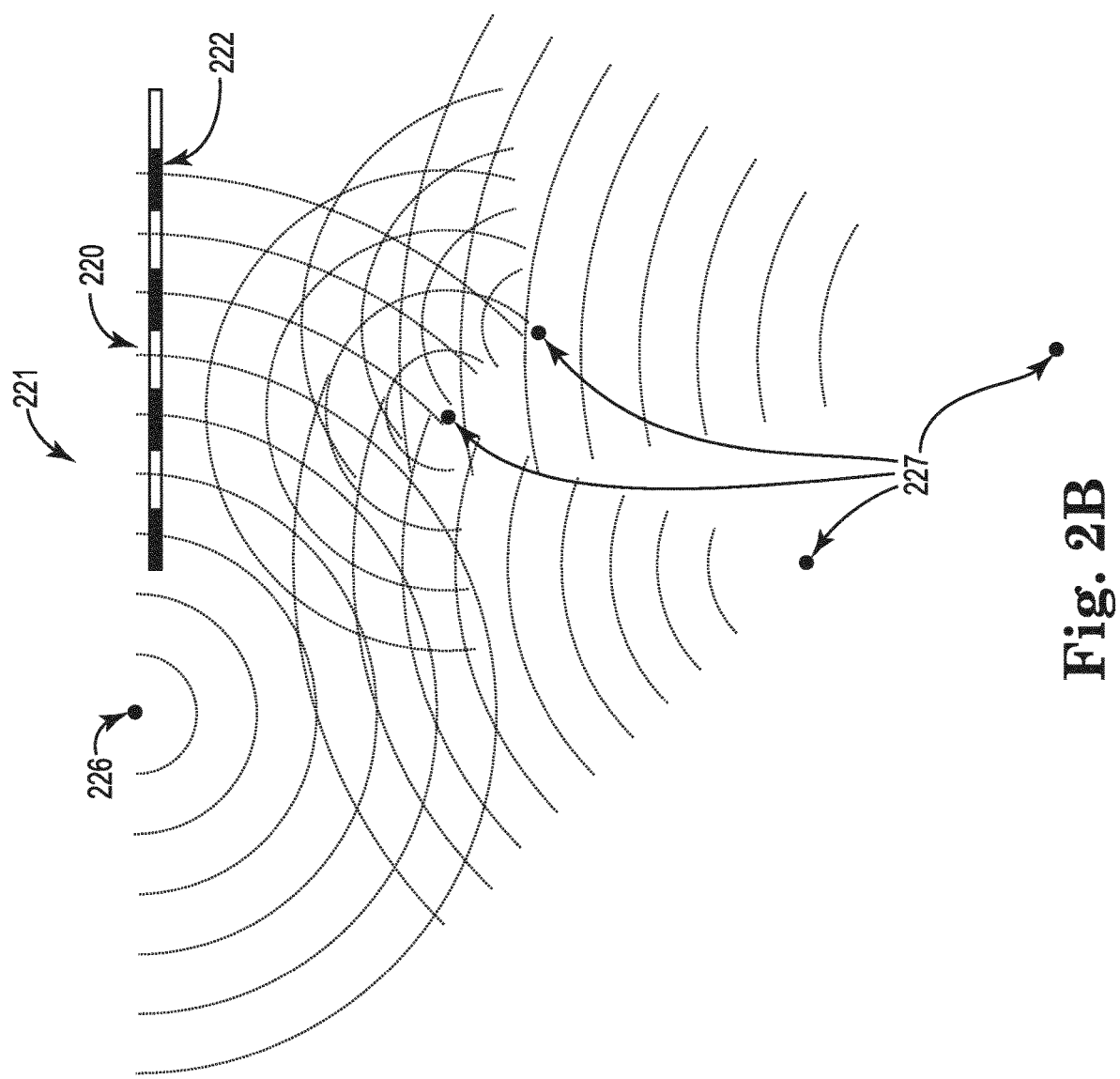

FIGS. 2A-2B illustrate mappings of measured seismic data associated with wavefield reconstruction. FIG. 2A illustrates a diagram 225 of a wavefield produced by a source 226. The wavefield is reflected 232 and diffracted 234 by an arbitrary buried geologic structure 205. A portion of the wavefield eventually returns to the streamer 220 where it may be detected and sampled by the seismic receivers 222. FIG. 2B illustrates a diagram 221 of the scattering potential that may produce the same reflected and diffracted wavefield in a homogeneous unbounded reference medium where geologic structure 205 was removed. Put another way, diagram 221 comprises a distribution of point sources 227.

During the wavefield synthesis, once a distribution of point sources 227 is known, new data may be synthetized at desired spatial locations of reconstructed wavefields using inverse mapping. These desired spatial locations include desired and/or proposed spatial locations for the reconstructed wavefield. As used herein, the spectrum comprises a scattering potential or an equivalent source distribution, among others. The locations where the reconstructed and decomposed wavefield is synthetized may be densely and uniformly sampled, so as to satisfy spatial sampling rules, or may be non-uniformly sampled, and may include or exclude the available wavefield measurements locations. As used herein, uniformly sampled data is data that is evenly sampled and satisfies spatial sampling rules. Uniformly sampled data may be uniformly distributed in space. As used herein, non-uniformly sampled data is data that is not uniformly sampled and may not satisfy spatial sampling rules. Non-uniformly sampled data may be non-uniformly distributed in space.

Both the spectral analysis and wavefield synthesis mapping may rely on a dictionary that, as used herein, consists of a plurality of elementary wavefields, acting as basis functions. Measurements may therefore be described as a superposition of elementary wavefields, each scaled by an appropriate real or complex-valued spectral coefficient.

Individually, each basis function may be chosen as the wavefield which would be recorded at the physical seismic receiver locations if an instantaneous point source were fired at time $t'$ at a generic location $r'=\{x', y', z'\}$ of a fictitious homogeneous reference medium characterized by a constant wave-propagation velocity $c$.

For the case of 3D wave propagation, each basis function may be unambiguously identified by a unique combination of five spectral parameters: $t'$, $x'$, $y'$, $z'$, and $c$. In the case of two-dimensional (2D) propagation, basis functions may be identified by a unique combination of four spectral parameters: $t'$, $x'$, $z'$, and $c$.

Each basis function may correspond to a spectral coefficient. A region of support for spectral coefficients and basis functions may be defined as a list of unique combinations of the spectral parameters which may be of interest. For example, the region of support may be defined by all possible combinations of $t'=[t'_1, t'_2, t'_3, t'_4, t'_5, t'_6]$, $x'=[x'_1, x'_2, x'_3]$; $y'=[y'_1, y'_2]$; $z'=[z'_1, z'_2, z'_3, z'_4]$; $c=[c_1, c_2, c_3, c_4, c_5]$, resulting in 6×3×2×4×5=720 unique combinations. The portion of space spanned by the region of support (parameters $x'$ and $y'$) may be smaller, equal or may exceed the portion of area covered by available wavefield measurements ($x$ and $y$).

The reference media may be chosen as homogeneous whole-spaces or half-spaces. Homogeneous whole-space refers to an indefinitely extended reference medium, whose properties do not change with the location where observations may be carried out. Because of its indefinite extension, the whole-space is said "unbounded". By contrast, half-space (or "bounded" homogeneous reference medium) refers to a reference medium that lies entirely on one side of an indefinitely extended 2D surface. In the context of this disclosure, a half-space reference medium is bounded by a reflecting horizontal surface representing an idealized sea surface. In at least one embodiment, elementary wavefields suitable for mapping measured pressure components may be chosen as the scalar Green's function $G_0^P$ for the homogeneous whole-space (unbounded reference medium) characterized by a constant wave velocity $c$, given by:

$$G_0^P(\omega, r, t', r', c) = \frac{e^{-i\frac{\omega}{c}\|r-r'\|-i\omega t'}}{\|r-r'\|},$$

where $r=\{x, y, z\}$ is the generic location of a seismic receiver, $r'=\{x', y', z'\}$ the generic location of a scattering point in the subsurface, $\|\ \|$ indicates the magnitude of a vector, and $\omega$ is the angular temporal frequency. Temporal angular frequency is the variable resulting from the application of the Fourier transform along the temporal axis of the seismic measurements.

The notion of Green's function used in this context refers to elementary solutions of the Helmoltz scalar wave equation:

$$\left[\nabla^2 + \frac{\omega^2}{c^2}\right]G_0^P(\omega, r, t', r', c) = -\delta(r-r')e^{-i\omega t'},$$

where $\nabla$ is the Laplacian operator and $\delta$ is the Dirac delta function.

The elementary wavefields $G_0^{Px}$ and $G_0^{Py}$ suitable for mapping measured pressure's gradient along the spatial direction x and y may be chosen as:

$$G_0^{Px}(\omega, r, t', r', c) = (x-x')e^{-i\frac{\omega}{c}\|r-r'\|-i\omega t'}\left[-\frac{i\omega}{c\|r-r'\|^2} - \frac{1}{\|r-r'\|^3}\right], \text{ and}$$

$$G_0^{Py}(\omega, r, t', r', c) = (y-y')e^{-i\frac{\omega}{c}\|r-r'\|-i\omega t'}\left[-\frac{i\omega}{c\|r-r'\|^2} - \frac{1}{\|r-r'\|^3}\right],$$

respectively, where $r-r'=\{x-x', y-y', z-z'\}$. Similarly, the elementary wavefields $G_0^{Vx}$ and $G_0^{Vy}$ suitable for mapping measured particle velocity along the spatial direction x and y may be chosen as:

$$G_0^{Vx}(\omega, r, t', r', c) = (x-x')e^{-i\frac{\omega}{c}\|r-r'\|-i\omega t'}\left[\frac{1}{\|r-r'\|^2} - \frac{ic}{\omega\|r-r'\|^3}\right], \text{ and}$$

$$G_0^{Vy}(\omega, r, t', r', c) = (y-y')e^{-i\frac{\omega}{c}\|r-r'\|-i\omega t'}\left[\frac{1}{\|r-r'\|^2} - \frac{ic}{\omega\|r-r'\|^3}\right],$$

respectively. Further, the elementary wavefields $G_0^{Pz}$ and $G_0^{Vz}$ suitable for mapping the measurements of pressure's vertical gradient and the vertical component of particle velocity may be chosen as:

$$G_0^{Pz}(\omega, r, t', r', c) = (z-z')e^{-i\frac{\omega}{c}\|r-r'\|-i\omega t'}\left[-\frac{i\omega}{c\|r-r'\|^2} - \frac{1}{\|r-r'\|^3}\right], \text{ and}$$

$$G_0^{Vz}(\omega, r, t', r', c) = (z-z')e^{-i\frac{\omega}{c}\|r-r'\|-i\omega t'}\left[\frac{1}{\|r-r'\|^2} - \frac{ic}{\omega\|r-r'\|^3}\right],$$

respectively.

In some embodiments, a decomposition of the wavefield into its upward and downward propagating constituents may be achieved by allowing the region of support for the scattering potential to extend above and below the measurement surface. As used herein, the measurement surface may be the surface defined by the locations of seismic receivers. The measurement surface may be plane or curved, and as such, the seismic receivers may not be required to lie at a constant depth. The upward propagating constituent of the reconstructed wavefield may be synthetized using the portion of the scattering potential below the measurement surface. Similarly, the down-going propagating constituent of the reconstructed wavefield may be synthetized using the portion of the scattering potential above the measurement surface. In other embodiments, the region of support may be limited to the region below the cable: $z'>z$. In such a case, specific elementary wavefields $G_{0(up)}^{Pz}$, $G_{0(dn)}^{Pz}$ and $G_{0(up)}^{Vz}$, $G_{0(dn)}^{Vz}$ may be introduced to explicitly account for the upward propagating constituents from below the cable and downward propagating constituents from above the cable:

$$G_{0(up)}^{Pz}(\omega, r, t', r', c) = -|z-z'|e^{-i\frac{\omega}{c}\|r-r'\|-i\omega t'}\left[-\frac{i\omega}{c\|r-r'\|^2} - \frac{1}{\|r-r'\|^3}\right],$$

$$G_{0(dn)}^{Pz}(\omega, r, t', r', c) = +|z-z'|e^{-i\frac{\omega}{c}\|r-r'\|-i\omega t'}\left[-\frac{i\omega}{c\|r-r'\|^2} - \frac{1}{\|r-r'\|^3}\right],$$

and $$G_{0(up)}^{Vz}(\omega, r, t', r', c) = -|z-z'|e^{-i\frac{\omega}{c}\|r-r'\|-i\omega t'}\left[\frac{1}{c\|r-r'\|^2} - \frac{ic}{\omega\|r-r'\|^3}\right],$$

$$G_{0(up)}^{Vz}(\omega, r, t', r', c) = +|z-z'|e^{-i\frac{\omega}{c}\|r-r'\|-i\omega t'}\left[\frac{1}{c\|r-r'\|^2} - \frac{ic}{\omega\|r-r'\|^3}\right].$$

In other embodiments, the elementary wavefields may be described as Green's functions $G_{0(fs)}$ for homogeneous reference media characterized by a constant wave velocity c and bounded by a horizontal interface representing an idealized flat sea surface. Half-space Green's functions may be thought of as the superposition of two whole-space Green's functions:

$$G_{0(fs)}^P(\omega,r,t',r',c)=G_0^P(\omega,r,t',r',c)-G_0^P(\omega,r,t',r'_m,c),$$

where r' is confined to the region of the subsurface below the sea-surface ($z'>z$) and where the second term describes a wavefield generated at a mirror location $r'_m=\{x', y', -z'\}$ specular with respect to $r'=\{x', y', z'\}$ across the sea interface.

Similarly, the elementary wavefields suitable for pressure gradients and particle velocity measurements are:

$$G_{0(fs)}^{Px}(\omega,r,t',r',c)=G_0^{Px}(\omega,r,t',r',c)-G_0^{Px}(\omega,r,t',r'_m,c),$$

$$G_{0(fs)}^{Py}(\omega,r,t',r',c)=G_0^{Py}(\omega,r,t',r',c)-G_0^{Py}(\omega,r,t',r'_m,c),$$

$$G_{0(fs)}^{Pz}(\omega,r,t',r',c)=G_0^{Pz}(\omega,r,t',r',c)-G_0^{Pz}(\omega,r,t',r'_m,c),$$

$$G_{0(fs)}^{Vx}(\omega,r,t',r',c)=G_0^{Vx}(\omega,r,t',r',c)-G_0^{Vx}(\omega,r,t',r'_m,c),$$

$$G_{0(fs)}^{Vy}(\omega,r,t',r',c)=G_0^{Vy}(\omega,r,t',r',c)-G_0^{Vy}(\omega,r,t',r'_m,c),$$

$$G_{0(fs)}^{Vz}(\omega,r,t',r',c)=G_0^{Vz}(\omega,r,t',r',c)-G_0^{Vz}(\omega,r,t',r'_m,c).$$

The expressions listed above include terms causing the amplitude of the elementary wavefields to decay as the wavefront propagates away from the source, a phenomenon known as spreading loss. In some embodiments, such spreading losses may be ignored. In this example, the elementary wavefields degenerate to generic elementary functions, which do not necessarily constitute solutions to any wave equations, as their amplitude remains constant with the progress of propagation. These functions describe spheres, when observed as functions of x, y and z, or hyperboloids, when observed as functions of t, x, and y. In the unbounded case, the elementary shapes are given by:

$$H_0^P(\omega, r, t', r', c) = e^{-i\frac{\omega}{c}\|r-r'\|-i\omega t'},$$

$$H_0^{Px}(\omega, r, t', r') = -i\frac{\omega}{c}\frac{x-x'}{\|r-r'\|}e^{-i\frac{\omega}{c}\|r-r'\|-i\omega t'},$$

$$H_0^{Py}(\omega, r, t', r') = -i\frac{\omega}{c}\frac{y-y'}{\|r-r'\|}e^{-i\frac{\omega}{c}\|r-r'\|-i\omega t'},$$

$$H_0^{Vx}(\omega, r, t', r') = \frac{x-x'}{\|r-r'\|}e^{-i\frac{\omega}{c}\|r-r'\|-i\omega t'},$$

$$H_0^{Vy}(\omega, r, t', r') = \frac{y-y'}{\|r-r'\|}e^{-i\frac{\omega}{c}\|r-r'\|-i\omega t'},$$

$$H_0^{Pz}(\omega, r, t', r') = -i\frac{\omega}{c}\frac{z-z'}{\|r-r'\|}e^{-i\frac{\omega}{c}\|r-r'\|-i\omega t'},$$

$$H_0^{Vz}(\omega, r, t', r') = \frac{z-z'}{\|r-r'\|}e^{-i\frac{\omega}{c}\|r-r'\|-i\omega t'},$$

and in the bounded case, with $z'>z$, by:

$$H_{0(fs)}^P(\omega,r,t',r',c)=H_0^P(\omega,r,t',r',c)-H_0^P(\omega,r,t',r'_m,c),$$

$$H_{0(fs)}^{Px}(\omega,r,t',r',c)=H_0^{Px}(\omega,r,t',r',c)-H_0^{Px}(\omega,r,t',r'_m,c),$$

$$H_{0(fs)}^{Py}(\omega,r,t',r',c)=H_0^{Py}(\omega,r,t',r',c)-H_0^{Py}(\omega,r,t',r'_m,c),$$

$$H_{0(fs)}^{Pz}(\omega,r,t',r',c)=H_0^{Pz}(\omega,r,t',r',c)-H_0^{Pz}(\omega,r,t',r'_m,c),$$

$$H_{0(fs)}^{Vx}(\omega,r,t',r',c)=H_0^{Vx}(\omega,r,t',r',c)-H_0^{Vx}(\omega,r,t',r'_m,c),$$

$$H_{0(fs)}^{Vy}(\omega,r,t',r',c)=H_0^{Vy}(\omega,r,t',r',c)-H_0^{Vy}(\omega,r,t',r'_m,c),$$

$$H_{0(fs)}^{Vz}(\omega,r,t',r',c)=H_0^{Vz}(\omega,r,t',r',c)-H_0^{Vz}(\omega,r,t',r'_m,c).$$

In the particular case where the firing delay of the equivalent sources is null (t'=0), the dictionary described by $H_0^P$ simplifies to that used by an Apex-Shifted Hyperbolic Radon Transform (ASHRT) analysis. In accordance with the present disclosure ASHRT may be generalized by introducing an additional parameter, accounting for the firing delay, or asymptote shift, thereby defining the Asymptote and Apex-Shifted Hyperbolic Radon Transform (AASHRT).

Within the spectral analysis of the present disclosure, the scattering potential associated with the available wavefield measurements may be obtained by numerically solving a linear system of equations described by the expression:

$$d = \mathcal{L} m,$$

where d is the vector containing the measured wavefield samples, m is the vector containing the sought for samples of the scattering potential; $\mathcal{L}$ is the wavefield synthesis transform matrix, whose columns are populated with a multiplicity of realizations of the elementary wavefields, spanning a chosen range of $r' = \{x', y', z'\}$, t' and c.

In at least one embodiment, the available wavefield measurements and the associated scattering potential are considered in their temporally Fourier transformed versions, such that the available wavefield measurements's time axis t and the potential's firing delay axis t' are replaced by a temporal frequency axis $\omega$. In the temporal frequency domain, the mapping between scattering potential and available wavefield measurements may be carried out independently for each temporal frequency, thereby reducing the size of the linear system of equations to be solved. In this context independently means the mapping may occur entirely within the subsets of the scattering potential and of the available wavefield measurements characterized by a common individual value of the temporal frequency. In an example, the vector d contains the samples of the available wavefield measurements, for instance P, $P_x$, $P_y$ and $P_z$, for an individual value of the temporal frequency $\omega$, and m contains the samples of the scattering potential $\rho$ at the same temporal frequency.

$$\begin{bmatrix} P(\bar{\omega}, r_{p,1}) \\ P(\bar{\omega}, r_{p,2}) \\ \ldots \\ P(\bar{\omega}, r_{p,np}) \\ P_x(\bar{\omega}, r_{x,1}) \\ P_x(\bar{\omega}, r_{x,2}) \\ \ldots \\ P_x(\bar{\omega}, r_{x,nx}) \\ P_y(\bar{\omega}, r_{y,1}) \\ P_y(\bar{\omega}, r_{y,2}) \\ \ldots \\ P_y(\bar{\omega}, r_{y,ny}) \\ P_z(\bar{\omega}, r_{z,1}) \\ P_z(\bar{\omega}, r_{z,2}) \\ \ldots \\ P_z(\bar{\omega}, r_{z,nz}) \end{bmatrix} = \begin{bmatrix} G_0^P(\bar{\omega}, r_{p,1}, r'_1 \ldots r'_{nr}, c_1) & G_0^P(\bar{\omega}, r_{p,1}, r'_1 \ldots r'_{nr}, c_2) & \ldots & G_0^P(\bar{\omega}, r_{p,1}, r'_1 \ldots r'_{nr}, c_{nc}) \\ G_0^P(\bar{\omega}, r_{p,2}, r'_1 \ldots r'_{nr}, c_1) & G_0^P(\bar{\omega}, r_{p,2}, r'_1 \ldots r'_{nr}, c_2) & \ldots & G_0^P(\bar{\omega}, r_{p,2}, r'_1 \ldots r'_{nr}, c_{nc}) \\ \ldots & \ldots & \ldots & \ldots \\ G_0^P(\bar{\omega}, r_{p,np}, r'_1 \ldots r'_{nr}, c_1) & G_0^P(\bar{\omega}, r_{p,np}, r'_1 \ldots r'_{nr}, c_2) & \ldots & G_0^P(\bar{\omega}, r_{p,np}, r'_1 \ldots r'_{nr}, c_{nc}) \\ G_0^{Px}(\bar{\omega}, r_{Px,1}, r'_1 \ldots r'_{nr}, c_1) & G_0^{Px}(\bar{\omega}, r_{Px,1}, r'_1 \ldots r'_{nr}, c_2) & \ldots & G_0^{Px}(\bar{\omega}, r_{Px,1}, r'_1 \ldots r'_{nr}, c_{nc}) \\ G_0^{Px}(\bar{\omega}, r_{Px,2}, r'_1 \ldots r'_{nr}, c_1) & G_0^{Px}(\bar{\omega}, r_{Px,2}, r'_1 \ldots r'_{nr}, c_2) & \ldots & G_0^{Px}(\bar{\omega}, r_{Px,2}, r'_1 \ldots r'_{nr}, c_{nc}) \\ \ldots & \ldots & \ldots & \ldots \\ G_0^{Px}(\bar{\omega}, r_{Px,nx}, r'_1 \ldots r'_{nr}, c_1) & G_0^{Px}(\bar{\omega}, r_{Px,nx}, r'_1 \ldots r'_{nr}, c_2) & \ldots & G_0^{Px}(\bar{\omega}, r_{Px,nx}, r'_1 \ldots r'_{nr}, c_{nc}) \\ G_0^{Py}(\bar{\omega}, r_{Py,1}, r'_1 \ldots r'_{nr}, c_1) & G_0^{Py}(\bar{\omega}, r_{Py,1}, r'_1 \ldots r'_{nr}, c_2) & \ldots & G_0^{Py}(\bar{\omega}, r_{Py,1}, r'_1 \ldots r'_{nr}, c_{nc}) \\ G_0^{Py}(\bar{\omega}, r_{Py,2}, r'_1 \ldots r'_{nr}, c_1) & G_0^{Py}(\bar{\omega}, r_{Py,2}, r'_1 \ldots r'_{nr}, c_2) & \ldots & G_0^{Py}(\bar{\omega}, r_{Py,2}, r'_1 \ldots r'_{nr}, c_{nc}) \\ \ldots & \ldots & \ldots & \ldots \\ G_0^{Py}(\bar{\omega}, r_{Py,ny}, r'_1 \ldots r'_{nr}, c_1) & G_0^{Py}(\bar{\omega}, r_{Py,ny}, r'_1 \ldots r'_{nr}, c_2) & \ldots & G_0^{Py}(\bar{\omega}, r_{Py,ny}, r'_1 \ldots r'_{nr}, c_{nc}) \\ G_0^{Pz}(\bar{\omega}, r_{Pz,1}, r'_1 \ldots r'_{nr}, c_1) & G_0^{Pz}(\bar{\omega}, r_{Pz,1}, r'_1 \ldots r'_{nr}, c_2) & \ldots & G_0^{Pz}(\bar{\omega}, r_{Pz,1}, r'_1 \ldots r'_{nr}, c_{nc}) \\ G_0^{Pz}(\bar{\omega}, r_{Pz,2}, r'_1 \ldots r'_{nr}, c_1) & G_0^{Pz}(\bar{\omega}, r_{Pz,2}, r'_1 \ldots r'_{nr}, c_2) & \ldots & G_0^{Pz}(\bar{\omega}, r_{Pz,2}, r'_1 \ldots r'_{nr}, c_{nc}) \\ \ldots & \ldots & \ldots & \ldots \\ G_0^{Pz}(\bar{\omega}, r_{Pz,nz}, r'_1 \ldots r'_{nr}, c_1) & G_0^{Pz}(\bar{\omega}, r_{Pz,nz}, r'_1 \ldots r'_{nr}, c_2) & \ldots & G_0^{Pz}(\bar{\omega}, r_{Pz,nz}, r'_1 \ldots r'_{nr}, c_{nc}) \end{bmatrix} \begin{bmatrix} \rho(\bar{\omega}, r'_1 \ldots r'_{nr}, c_1)^T \\ \rho(\bar{\omega}, r'_1 \ldots r'_{nr}, c_2)^T \\ \ldots \\ \rho(\bar{\omega}, r'_1 \ldots r'_{nr}, c_{nc})^T \end{bmatrix}$$

where the compact notation $f(x_1 \ldots x_n)$ indicates multiple instances of function $f$ evaluated at a range of values of its argument x, and arranged in a row; the superscript T denotes the transpose operator, and r' (region of support) extends above and below the measurement surface.

In a different but equivalent formulation, the region of support for r' may lie entirely below the measurement surface, and the scattering potential may be split into two terms representing the up-going and down-going contributions to the total wavefield. Again, the following system of linear equations may be solved at every fixed angular frequency $\bar{\omega}$:

$$
\begin{bmatrix}
P(\bar{\omega}, r_{p,1}) \\
P(\bar{\omega}, r_{p,2}) \\
\ldots \\
P(\bar{\omega}, r_{p,np}) \\
P_x(\bar{\omega}, r_{x,1}) \\
P_x(\bar{\omega}, r_{x,2}) \\
\ldots \\
P_x(\bar{\omega}, r_{x,nx}) \\
P_y(\bar{\omega}, r_{y,1}) \\
P_y(\bar{\omega}, r_{y,2}) \\
\ldots \\
P_y(\bar{\omega}, r_{y,ny}) \\
P_z(\bar{\omega}, r_{z,1}) \\
P_z(\bar{\omega}, r_{z,2}) \\
\ldots \\
P_z(\bar{\omega}, r_{z,nz})
\end{bmatrix}
=
\begin{bmatrix}
G^P_{0(up)}(\bar{\omega}, r_{p,1}, r'_1 \ldots r'_{nr}, c_1) & G^P_{0(up)}(\bar{\omega}, r_{p,1}, r'_1 \ldots r'_{nr}, c_2) & \ldots & G^P_{0(up)}(\bar{\omega}, r_{p,1}, r'_1 \ldots r'_{nr}, c_{nc}) \\
G^P_{0(up)}(\bar{\omega}, r_{p,2}, r'_1 \ldots r'_{nr}, c_1) & G^P_{0(up)}(\bar{\omega}, r_{p,2}, r'_1 \ldots r'_{nr}, c_2) & \ldots & G^P_{0(up)}(\bar{\omega}, r_{p,2}, r'_1 \ldots r'_{nr}, c_{nc}) \\
\ldots & \ldots & \ldots & \ldots \\
G^P_{0(up)}(\bar{\omega}, r_{p,np}, r'_1 \ldots r'_{nr}, c_1) & G^P_{0(up)}(\bar{\omega}, r_{p,np}, r'_1 \ldots r'_{nr}, c_2) & \ldots & G^P_{0(up)}(\bar{\omega}, r_{p,np}, r'_1 \ldots r'_{nr}, c_{nc}) \\
G^{Px}_{0(up)}(\bar{\omega}, r_{Px,1}, r'_1 \ldots r'_{nr}, c_1) & G^{Px}_{0(up)}(\bar{\omega}, r_{Px,1}, r'_1 \ldots r'_{nr}, c_2) & \ldots & G^{Px}_{0(up)}(\bar{\omega}, r_{Px,1}, r'_1 \ldots r'_{nr}, c_{nc}) \\
G^{Px}_{0(up)}(\bar{\omega}, r_{Px,2}, r'_1 \ldots r'_{nr}, c_1) & G^{Px}_{0(up)}(\bar{\omega}, r_{Px,2}, r'_1 \ldots r'_{nr}, c_2) & \ldots & G^{Px}_{0(up)}(\bar{\omega}, r_{Px,2}, r'_1 \ldots r'_{nr}, c_{nc}) \\
\ldots & \ldots & \ldots & \ldots \\
G^{Px}_{0(up)}(\bar{\omega}, r_{Px,nx}, r'_1 \ldots r'_{nr}, c_1) & G^{Px}_{0(up)}(\bar{\omega}, r_{Px,nx}, r'_1 \ldots r'_{nr}, c_2) & \ldots & G^{Px}_{0(up)}(\bar{\omega}, r_{Px,nx}, r'_1 \ldots r'_{nr}, c_{nc}) \\
G^{Py}_{0(up)}(\bar{\omega}, r_{Py,1}, r'_1 \ldots r'_{nr}, c_1) & G^{Py}_{0(up)}(\bar{\omega}, r_{Py,1}, r'_1 \ldots r'_{nr}, c_2) & \ldots & G^{Py}_{0(up)}(\bar{\omega}, r_{Py,1}, r'_1 \ldots r'_{nr}, c_{nc}) \\
G^{Py}_{0(up)}(\bar{\omega}, r_{Py,2}, r'_1 \ldots r'_{nr}, c_1) & G^{Py}_{0(up)}(\bar{\omega}, r_{Py,2}, r'_1 \ldots r'_{nr}, c_2) & \ldots & G^{Py}_{0(up)}(\bar{\omega}, r_{Py,2}, r'_1 \ldots r'_{nr}, c_{nc}) \\
\ldots & \ldots & \ldots & \ldots \\
G^{Py}_{0(up)}(\bar{\omega}, r_{Py,ny}, r'_1 \ldots r'_{nr}, c_1) & G^{Py}_{0(up)}(\bar{\omega}, r_{Py,ny}, r'_1 \ldots r'_{nr}, c_2) & \ldots & G^{Py}_{0(up)}(\bar{\omega}, r_{Py,ny}, r'_1 \ldots r'_{nr}, c_{nc}) \\
G^{Pz}_{0(up)}(\bar{\omega}, r_{Pz,1}, r'_1 \ldots r'_{nr}, c_1) & G^{Pz}_{0(up)}(\bar{\omega}, r_{Pz,1}, r'_1 \ldots r'_{nr}, c_2) & \ldots & G^{Pz}_{0(up)}(\bar{\omega}, r_{Pz,1}, r'_1 \ldots r'_{nr}, c_{nc}) \\
G^{Pz}_{0(up)}(\bar{\omega}, r_{Pz,2}, r'_1 \ldots r'_{nr}, c_1) & G^{Pz}_{0(up)}(\bar{\omega}, r_{Pz,2}, r'_1 \ldots r'_{nr}, c_2) & \ldots & G^{Pz}_{0(up)}(\bar{\omega}, r_{Pz,2}, r'_1 \ldots r'_{nr}, c_{nc}) \\
\ldots & \ldots & \ldots & \ldots \\
G^{Pz}_{0(up)}(\bar{\omega}, r_{Pz,nz}, r'_1 \ldots r'_{nr}, c_1) & G^{Pz}_{0(up)}(\bar{\omega}, r_{Pz,nz}, r'_1 \ldots r'_{nr}, c_2) & \ldots & G^{Pz}_{0(up)}(\bar{\omega}, r_{Pz,nz}, r'_1 \ldots r'_{nr}, c_{nc})
\end{bmatrix}
$$

$$
\begin{bmatrix}
G^P_{0(dn)}(\bar{\omega}, r_{p,1}, r'_1 \ldots r'_{nr}, c_1) & G^P_{0(dn)}(\bar{\omega}, r_{p,1}, r'_1 \ldots r'_{nr}, c_2) & \ldots & G^P_{0(dn)}(\bar{\omega}, r_{p,1}, r'_1 \ldots r'_{nr}, c_{nc}) \\
G^P_{0(dn)}(\bar{\omega}, r_{p,2}, r'_1 \ldots r'_{nr}, c_1) & G^P_{0(dn)}(\bar{\omega}, r_{p,2}, r'_1 \ldots r'_{nr}, c_2) & \ldots & G^P_{0(dn)}(\bar{\omega}, r_{p,2}, r'_1 \ldots r'_{nr}, c_{nc}) \\
\ldots & \ldots & \ldots & \ldots \\
G^P_{0(dn)}(\bar{\omega}, r_{p,np}, r'_1 \ldots r'_{nr}, c_1) & G^P_{0(dn)}(\bar{\omega}, r_{p,np}, r'_1 \ldots r'_{nr}, c_2) & \ldots & G^P_{0(dn)}(\bar{\omega}, r_{p,np}, r'_1 \ldots r'_{nr}, c_{nc}) \\
G^{Px}_{0(dn)}(\bar{\omega}, r_{Px,1}, r'_1 \ldots r'_{nr}, c_1) & G^{Px}_{0(dn)}(\bar{\omega}, r_{Px,1}, r'_1 \ldots r'_{nr}, c_2) & \ldots & G^{Px}_{0(dn)}(\bar{\omega}, r_{Px,1}, r'_1 \ldots r'_{nr}, c_{nc}) \\
G^{Px}_{0(dn)}(\bar{\omega}, r_{Px,2}, r'_1 \ldots r'_{nr}, c_1) & G^{Px}_{0(dn)}(\bar{\omega}, r_{Px,2}, r'_1 \ldots r'_{nr}, c_2) & \ldots & G^{Px}_{0(dn)}(\bar{\omega}, r_{Px,2}, r'_1 \ldots r'_{nr}, c_{nc}) \\
\ldots & \ldots & \ldots & \ldots \\
G^{Px}_{0(dn)}(\bar{\omega}, r_{Px,nx}, r'_1 \ldots r'_{nr}, c_1) & G^{Px}_{0(dn)}(\bar{\omega}, r_{Px,nx}, r'_1 \ldots r'_{nr}, c_2) & \ldots & G^{Px}_{0(dn)}(\bar{\omega}, r_{Px,nx}, r'_1 \ldots r'_{nr}, c_{nc}) \\
G^{Py}_{0(dn)}(\bar{\omega}, r_{Py,1}, r'_1 \ldots r'_{nr}, c_1) & G^{Py}_{0(dn)}(\bar{\omega}, r_{Py,1}, r'_1 \ldots r'_{nr}, c_2) & \ldots & G^{Py}_{0(dn)}(\bar{\omega}, r_{Py,1}, r'_1 \ldots r'_{nr}, c_{nc}) \\
G^{Py}_{0(dn)}(\bar{\omega}, r_{Py,2}, r'_1 \ldots r'_{nr}, c_1) & G^{Py}_{0(dn)}(\bar{\omega}, r_{Py,2}, r'_1 \ldots r'_{nr}, c_2) & \ldots & G^{Py}_{0(dn)}(\bar{\omega}, r_{Py,2}, r'_1 \ldots r'_{nr}, c_{nc}) \\
\ldots & \ldots & \ldots & \ldots \\
G^{Py}_{0(dn)}(\bar{\omega}, r_{Py,ny}, r'_1 \ldots r'_{nr}, c_1) & G^{Py}_{0(dn)}(\bar{\omega}, r_{Py,ny}, r'_1 \ldots r'_{nr}, c_2) & \ldots & G^{Py}_{0(dn)}(\bar{\omega}, r_{Py,ny}, r'_1 \ldots r'_{nr}, c_{nc}) \\
G^{Pz}_{0(dn)}(\bar{\omega}, r_{Pz,1}, r'_1 \ldots r'_{nr}, c_1) & G^{Pz}_{0(dn)}(\bar{\omega}, r_{Pz,1}, r'_1 \ldots r'_{nr}, c_2) & \ldots & G^{Pz}_{0(dn)}(\bar{\omega}, r_{Pz,1}, r'_1 \ldots r'_{nr}, c_{nc}) \\
G^{Pz}_{0(dn)}(\bar{\omega}, r_{Pz,2}, r'_1 \ldots r'_{nr}, c_1) & G^{Pz}_{0(dn)}(\bar{\omega}, r_{Pz,2}, r'_1 \ldots r'_{nr}, c_2) & \ldots & G^{Pz}_{0(dn)}(\bar{\omega}, r_{Pz,2}, r'_1 \ldots r'_{nr}, c_{nc}) \\
\ldots & \ldots & \ldots & \ldots \\
G^{Pz}_{0(dn)}(\bar{\omega}, r_{Pz,nz}, r'_1 \ldots r'_{nr}, c_1) & G^{Pz}_{0(dn)}(\bar{\omega}, r_{Pz,nz}, r'_1 \ldots r'_{nr}, c_2) & \ldots & G^{Pz}_{0(dn)}(\bar{\omega}, r_{Pz,nz}, r'_1 \ldots r'_{nr}, c_{nc})
\end{bmatrix}
\begin{bmatrix}
\rho_{up}(\bar{\omega}, r'_1 \ldots r'_{nr}, c_1)^T \\
\rho_{up}(\bar{\omega}, r'_1 \ldots r'_{nr}, c_2)^T \\
\ldots \\
\rho_{up}(\bar{\omega}, r'_1 \ldots r'_{nr}, c_{nc})^T \\
\rho_{dn}(\bar{\omega}, r'_1 \ldots r'_{nr}, c_1)^T \\
\rho_{dn}(\bar{\omega}, r'_1 \ldots r'_{nr}, c_2)^T \\
\ldots \\
\rho_{up}(\bar{\omega}, r'_1 \ldots r'_{nr}, c_{nc})^T
\end{bmatrix}.
$$

In another example, the half-space elementary wavefields may be used. Thus, the following system of linear equations may be solved at every fixed angular frequency $\bar{\omega}$:

$$\begin{bmatrix} P(\varpi, r_{p,1}) \\ P(\varpi, r_{p,2}) \\ \cdots \\ P(\varpi, r_{p,np}) \\ P_x(\varpi, r_{x,1}) \\ P_x(\varpi, r_{x,2}) \\ \cdots \\ P_x(\varpi, r_{x,nx}) \\ P_y(\varpi, r_{y,1}) \\ P_y(\varpi, r_{y,2}) \\ \cdots \\ P_y(\varpi, r_{y,ny}) \\ P_z(\varpi, r_{z,1}) \\ P_z(\varpi, r_{z,2}) \\ \cdots \\ P_z(\varpi, r_{z,nz}) \end{bmatrix} = \begin{bmatrix} G_{0(fs)}^P(\varpi, r_{p,1}, r'_1 \ldots r'_{nr}, c_1) & G_{0(fs)}^P(\varpi, r_{p,1}, r'_1 \ldots r'_{nr}, c_2) & \cdots & G_{0(fs)}^P(\varpi, r_{p,1}, r'_1 \ldots r'_{nr}, c_{nc}) \\ G_{0(fs)}^P(\varpi, r_{p,2}, r'_1 \ldots r'_{nr}, c_1) & G_{0(fs)}^P(\varpi, r_{p,2}, r'_1 \ldots r'_{nr}, c_2) & \cdots & G_{0(fs)}^P(\varpi, r_{p,2}, r'_1 \ldots r'_{nr}, c_{nc}) \\ \cdots & \cdots & \cdots & \cdots \\ G_{0(fs)}^P(\varpi, r_{p,np}, r'_1 \ldots r'_{nr}, c_1) & G_{0(fs)}^P(\varpi, r_{p,np}, r'_1 \ldots r'_{nr}, c_2) & \cdots & G_{0(fs)}^P(\varpi, r_{p,np}, r'_1 \ldots r'_{nr}, c_{nc}) \\ G_{0(fs)}^{Px}(\varpi, r_{Px,1}, r'_1 \ldots r'_{nr}, c_1) & G_{0(fs)}^{Px}(\varpi, r_{Px,1}, r'_1 \ldots r'_{nr}, c_2) & \cdots & G_{0(fs)}^{Px}(\varpi, r_{Px,1}, r'_1 \ldots r'_{nr}, c_{nc}) \\ G_{0(fs)}^{Px}(\varpi, r_{Px,2}, r'_1 \ldots r'_{nr}, c_1) & G_{0(fs)}^{Px}(\varpi, r_{Px,2}, r'_1 \ldots r'_{nr}, c_2) & \cdots & G_{0(fs)}^{Px}(\varpi, r_{Px,2}, r'_1 \ldots r'_{nr}, c_{nc}) \\ \cdots & \cdots & \cdots & \cdots \\ G_{0(fs)}^{Px}(\varpi, r_{Px,nx}, r'_1 \ldots r'_{nr}, c_1) & G_{0(fs)}^{Px}(\varpi, r_{Px,nx}, r'_1 \ldots r'_{nr}, c_2) & \cdots & G_{0(fs)}^{Px}(\varpi, r_{Px,nx}, r'_1 \ldots r'_{nr}, c_{nc}) \\ G_{0(fs)}^{Py}(\varpi, r_{Py,1}, r'_1 \ldots r'_{nr}, c_1) & G_{0(fs)}^{Py}(\varpi, r_{Py,1}, r'_1 \ldots r'_{nr}, c_2) & \cdots & G_{0(fs)}^{Py}(\varpi, r_{Py,1}, r'_1 \ldots r'_{nr}, c_{nc}) \\ G_{0(fs)}^{Py}(\varpi, r_{Py,2}, r'_1 \ldots r'_{nr}, c_1) & G_{0(fs)}^{Py}(\varpi, r_{Py,2}, r'_1 \ldots r'_{nr}, c_2) & \cdots & G_{0(fs)}^{Py}(\varpi, r_{Py,2}, r'_1 \ldots r'_{nr}, c_{nc}) \\ \cdots & \cdots & \cdots & \cdots \\ G_{0(fs)}^{Py}(\varpi, r_{Py,ny}, r'_1 \ldots r'_{nr}, c_1) & G_{0(fs)}^{Py}(\varpi, r_{Py,ny}, r'_1 \ldots r'_{nr}, c_2) & \cdots & G_{0(fs)}^{Py}(\varpi, r_{Py,ny}, r'_1 \ldots r'_{nr}, c_{nc}) \\ G_{0(fs)}^{Pz}(\varpi, r_{Pz,1}, r'_1 \ldots r'_{nr}, c_1) & G_{0(fs)}^{Pz}(\varpi, r_{Pz,1}, r'_1 \ldots r'_{nr}, c_2) & \cdots & G_{0(fs)}^{Pz}(\varpi, r_{Pz,1}, r'_1 \ldots r'_{nr}, c_{nc}) \\ G_{0(fs)}^{Pz}(\varpi, r_{Pz,2}, r'_1 \ldots r'_{nr}, c_1) & G_{0(fs)}^{Pz}(\varpi, r_{Pz,2}, r'_1 \ldots r'_{nr}, c_2) & \cdots & G_{0(fs)}^{Pz}(\varpi, r_{Pz,2}, r'_1 \ldots r'_{nr}, c_{nc}) \\ \cdots & \cdots & \cdots & \cdots \\ G_{0(fs)}^{Pz}(\varpi, r_{Pz,nz}, r'_1 \ldots r'_{nr}, c_1) & G_{0(fs)}^{Pz}(\varpi, r_{Pz,nz}, r'_1 \ldots r'_{nr}, c_2) & \cdots & G_{0(fs)}^{Pz}(\varpi, r_{Pz,nz}, r'_1 \ldots r'_{nr}, c_{nc}) \end{bmatrix} \begin{bmatrix} \rho_{up}(\varpi, r'_1 \ldots r'_{nr}, c_1)^T \\ \rho_{up}(\varpi, r'_1 \ldots r'_{nr}, c_2)^T \\ \cdots \\ \rho_{up}(\varpi, r'_1 \ldots r'_{nr}, c_{nc})^T \end{bmatrix}$$

where the region of support for r' lies entirely below the sea surface.

The coefficients of the scattering potential may be obtained by minimization of some metric of the residual, which may be the difference between the available wavefield measurements and the wavefield synthetized at the measurement locations, within each individual value of the temporal frequency. In some examples, the solution may be obtained through a least squares scheme which, as used herein comprises the least squares method (LS) or the least squares QR factorization (LSQR) algorithm.

In some embodiments, the spectrum may be estimated through a weighted least-squares scheme, such as the Prior-conditioned LSQR method, or through a sparseness-enforcing method such as a weighted matching pursuit. In the context of this disclosure, "sparseness-promoting numerical solver" refers to a variety of numerical solvers designed to simultaneously minimize residuals and maximize spectral sparseness. The desired weights may be obtained from a sum or an average over different frequencies of the solutions previously obtained, for example, through a non-weighted least-squares scheme, or from a previous iteration of the weighted scheme. The average may be taken over all or a subset of the frequencies, for example the low frequencies, less affected by spatial aliasing. The scattering potential may be obtained in a single pass in increasing frequency order. At lower unaliased frequencies, weights may be determined based on the solution from a non-weighted scheme, and then applied within the weighted scheme at higher frequencies.

In some embodiments, the elementary wavefields suitable for mapping measured pressure components may be chosen as the wavenumber-domain scalar Green's function $G_0^P$ for the homogeneous whole-space (unbounded reference medium) characterized by a constant wave velocity c, given by:

$$G_0^P(\omega, k_x k_y, z, t', z', c) = e^{i\omega t'} \frac{e^{i\kappa_z |z-z'|}}{-i\kappa_z},$$

where the horizontal wavenumbers $k_x$ and $k_y$ are the Fourier-conjugate variables of x and y, the vertical wavenumber is defined as $$\kappa_z = \sqrt{\frac{\omega^2}{c^2} - k_x^2 - k_y^2}.$$

The notion of the Green's function used in this context refers to elementary solutions of the wavenumber domain Helmholtz scalar wave equation:

$$\left[\frac{\omega^2}{c^2} - k_x^2 - k_y^2\right] G_0^P(\omega, k_x, k_y, t', c) = -e^{-i\omega t'}.$$

The elementary wavefields $G_0^{Px}$ and $G_0^{Py}$ suitable for mapping measured pressure's gradient along the horizontal spatial directions x and y in the wavenumber domain may be chosen as:

$$G_0^{Px}(\omega, k_x k_y, z, t', z', c) = -\frac{k_x}{\kappa_z} e^{i\omega t'} e^{i\kappa_z |z-z'|},$$

$$G_0^{Py}(\omega, k_x k_y, z, t', z', c) = -\frac{k_y}{\kappa_z} e^{i\omega t'} e^{i\kappa_z |z-z'|}.$$

Similarly, the elementary wavefields $G_0^{Vx}$ and $G_0^{Vy}$ suitable for mapping measured particle velocity along the horizontal spatial directions x and y in the wavenumber domain may be chosen as:

$$G_0^{Vx}(\omega, k_x k_y, z, t', z', c) = -\frac{ick_x}{\omega \kappa_z} e^{i\omega t'} e^{i\kappa_z |z-z'|},$$

$$G_0^{Vy}(\omega, k_x k_y, z, t', z', c) = -\frac{ick_y}{\omega \kappa_z} e^{i\omega t'} e^{i\kappa_z |z-z'|}.$$

Further, the elementary wavefields $G_0^{Pz}$ and $G_0^{Vz}$ suitable for mapping the measurements of pressure's vertical gradient and the vertical component of particle velocity in the wavenumber domain may be chosen as:

$$G_0^{Pz}(\omega, k_x, k_y, z, t', z', c) = -\text{sgn}(z-z')e^{i\omega t'}e^{i\kappa_z|z-z'|},$$

$$G_0^{Vz}(\omega, k_x, k_y, z, t', z', c) = i\frac{c}{\omega}\text{sgn}(z-z')e^{i\omega t'}e^{i\kappa_z|z-z'|}.$$

As shown in previously described embodiments, wavefield decomposition into its upward and downward propagating constituents may be obtained in the wavenumber domain by allowing the region of support to extend above and below the measurement surface. In other embodiments, wavefield decomposition may be implemented by limiting the region of support to the region below the measurement surface and introducing specific base functions, for example Green's functions, to explicitly account for the up-going contributions from below the cable and down-going contributions from above the cable.

In some embodiments, the numerical solution m to the linear system of equations $$d = \mathcal{L}m,$$

(where d is the vector containing the measured seismic data after a temporal Fourier transform and m is the vector containing the samples of the scattering potential), may be obtained without explicitly formulating the transform matrix $\mathcal{L}$. Linear operators $\mathcal{L}(\ )$ and $\mathcal{L}^H(\ )$ may be devised such that $\mathcal{L}(\ )$ implements the wavefield synthesis mapping d= $\mathcal{L}$(m), and $\mathcal{L}^H(\ )$ implements the spectral analysis mapping $\hat{m}=\mathcal{L}^H(d)$, or adjoint mapping, where $\hat{m}$ represents the estimate of the scattering potential.

For example, the operations carried out by $\mathcal{L}(\ )$ and $\mathcal{L}^H(\ )$ may be described as follows:

$$\mathcal{L}_{\substack{x' \to x \\ y' \to y \\ t', z', c \to \omega, z}} (m(t', z', x', y', c)) =$$

$$\mathcal{F}_{\substack{k_x \to x \\ k_y \to y}} \left( \mathcal{G}_{t', z', c \to \omega, z} \left( \mathcal{F}^H_{\substack{x' \to k_x \\ y' \to k_y}} (m(t', z', x', y', c)) \right) \right),$$

$$\mathcal{L}^H_{\substack{x \to x' \\ y \to y' \\ \omega, z \to t', c}} (d(\omega, x, y, z)) =$$

$$\mathcal{F}_{\substack{k_x \to x' \\ k_y \to y'}} \left( \mathcal{G}^H_{\omega, z \to t', z', c} \left( F^H_{\substack{x' \to k_x \\ y' \to k_y}} (d(\omega, x, y, z)) \right) \right),$$

where $\mathcal{F}(\ )$ is a further operator representing a Fourier transform, mapping its input from the wavenumber domain to the spatial domain, and $\mathcal{F}^H(\ )$ an operator representing an adjoint Fourier transform, mapping its input from the spatial domain to the wavenumber domain. Additionally, $\mathcal{G}(\ )$ and $\mathcal{G}^H(\ )$ represent products of the input vector with transform matrices. For example, the operator $\mathcal{G}(\ )$ may carry out the matrix-vector product between an explicitly formulated matrix $\mathcal{G}$ (whose columns contain the realizations of the wavenumber-domain elementary wavefields) and the input vector. Similarly, the operator $\mathcal{G}^H(\ )$ may carry out the matrix-vector product between an explicitly formulated matrix $\mathcal{G}^H$, whose rows contain the elementary wavefields' complex-conjugates, and the input vector.

For example, an explicitly formulated matrix $\mathcal{G}$ may be:

$$\mathcal{G} = \begin{bmatrix}
G_0^P(\omega_1, t'_1 \ldots t'_{nt'}, z'_1, c_1) & G_0^P(\omega_1, t'_1 \ldots t'_{nt'}, z'_2, c_1) & \ldots & G_0^P(\omega_1, t'_1 \ldots t'_{nt'}, z'_{nz'}, c_1) & \ldots & \ldots & \ldots \\
G_0^P(\omega_2, t'_1 \ldots t'_{nt'}, z'_1, c_1) & G_0^P(\omega_2, t'_1 \ldots t'_{nt'}, z'_2, c_1) & \ldots & G_0^P(\omega_2, t'_1 \ldots t'_{nt'}, z'_{nz'}, c_1) & \ldots & \ldots & \ldots \\
\ldots & \ldots & \ldots & \ldots & \ldots & \ldots & \ldots \\
G_0^{Px}(\omega_{n\omega}, t'_1 \ldots t'_{nt'}, z'_1, c_1) & G_0^{Px}(\omega_{n\omega}, t'_1 \ldots t'_{nt'}, z'_2, c_1) & \ldots & G_0^{Px}(\omega_{n\omega}, t'_1 \ldots t'_{nt'}, z'_{nz'}, c_1) & \ldots & \ldots & \ldots \\
G_0^{Px}(\omega_1, t'_1 \ldots t'_{nt'}, z'_1, c_1) & G_0^{Px}(\omega_1, t'_1 \ldots t'_{nt'}, z'_2, c_1) & \ldots & G_0^{Px}(\omega_1, t'_1 \ldots t'_{nt'}, z'_{nz'}, c_1) & \ldots & \ldots & \ldots \\
G_0^{Px}(\omega_2, t'_1 \ldots t'_{nt'}, z'_1, c_1) & G_0^{Px}(\omega_2, t'_1 \ldots t'_{nt'}, z'_2, c_1) & \ldots & G_0^{Px}(\omega_2, t'_1 \ldots t'_{nt'}, z'_{nz'}, c_1) & \ldots & \ldots & \ldots \\
\ldots & \ldots & \ldots & \ldots & \ldots & \ldots & \ldots \\
G_0^{Py}(\omega_{n\omega}, t'_1 \ldots t'_{nt'}, z'_1, c_1) & G_0^{Py}(\omega_{n\omega}, t'_1 \ldots t'_{nt'}, z'_2, c_1) & \ldots & G_0^{Py}(\omega_{n\omega}, t'_1 \ldots t'_{nt'}, z'_{nz'}, c_1) & \ldots & \ldots & \ldots \\
G_0^{Py}(\omega_1, t'_1 \ldots t'_{nt'}, z'_1, c_1) & G_0^{Py}(\omega_1, t'_1 \ldots t'_{nt'}, z'_2, c_1) & \ldots & G_0^{Py}(\omega_1, t'_1 \ldots t'_{nt'}, z'_{nz'}, c_1) & \ldots & \ldots & \ldots \\
G_0^{Py}(\omega_2, t'_1 \ldots t'_{nt'}, z'_1, c_1) & G_0^{Py}(\omega_2, t'_1 \ldots t'_{nt'}, z'_2, c_1) & \ldots & G_0^{Py}(\omega_2, t'_1 \ldots t'_{nt'}, z'_{nz'}, c_1) & \ldots & \ldots & \ldots \\
\ldots & \ldots & \ldots & \ldots & \ldots & \ldots & \ldots \\
G_0^{Pz}(\omega_{n\omega}, t'_1 \ldots t'_{nt'}, z'_1, c_1) & G_0^{Pz}(\omega_{n\omega}, t'_1 \ldots t'_{nt'}, z'_2, c_1) & \ldots & G_0^{Pz}(\omega_{n\omega}, t'_1 \ldots t'_{nt'}, z'_{nz'}, c_1) & \ldots & \ldots & \ldots \\
G_0^{Pz}(\omega_1, t'_1 \ldots t'_{nt'}, z'_1, c_1) & G_0^{Pz}(\omega_1, t'_1 \ldots t'_{nt'}, z'_2, c_1) & \ldots & G_0^{Pz}(\omega_1, t'_1 \ldots t'_{nt'}, z'_{nz'}, c_1) & \ldots & \ldots & \ldots \\
G_0^{Pz}(\omega_2, t'_1 \ldots t'_{nt'}, z'_1, c_1) & G_0^{Pz}(\omega_2, t'_1 \ldots t'_{nt'}, z'_2, c_1) & \ldots & G_0^{Pz}(\omega_2, t'_1 \ldots t'_{nt'}, z'_{nz'}, c_1) & \ldots & \ldots & \ldots \\
\ldots & \ldots & \ldots & \ldots & \ldots & \ldots & \ldots \\
G_0^{Pz}(\omega_{n\omega}, t'_1 \ldots t'_{nt'}, z'_1, c_1) & G_0^{Pz}(\omega_{n\omega}, t'_1 \ldots t'_{nt'}, z'_2, c_1) & \ldots & G_0^{Pz}(\omega_{n\omega}, t'_1 \ldots t'_{nt'}, z'_{nz'}, c_1) & \ldots & \ldots & \ldots
\end{bmatrix}$$

-continued $$\begin{bmatrix}
G_0^P(\omega_1, t_1' \ldots t_{nt'}', z_1', c_{nc}) & G_0^P(\omega_1, t_1' \ldots t_{nt'}', z_2', c_{nc}) & \ldots & G_0^P(\omega_1, t_1' \ldots t_{nt'}', z_{nz'}', c_{nc}) \\
G_0^P(\omega_2, t_1' \ldots t_{nt'}', z_1', c_{nc}) & G_0^P(\omega_2, t_1' \ldots t_{nt'}', z_2', c_{nc}) & \ldots & G_0^P(\omega_2, t_1' \ldots t_{nt'}', z_{nz'}', c_{nc}) \\
\ldots & \ldots & \ldots & \ldots \\
G_0^{Px}(\omega_{n\omega}, t_1' \ldots t_{nt'}', z_1', c_{nc}) & G_0^{Px}(\omega_{n\omega}, t_1' \ldots t_{nt'}', z_2', nc) & \ldots & G_0^{Px}(\omega_{n\omega}, t_1' \ldots t_{nt'}', z_{nz'}', c_{nc}) \\
G_0^{Px}(\omega_1, t_1' \ldots t_{nt'}', z_1', c_{nc}) & G_0^{Px}(\omega_1, t_1' \ldots t_{nt'}', z_2', c_{nc}) & \ldots & G_0^{Px}(\omega_1, t_1' \ldots t_{nt'}', z_{nz'}', c_{nc}) \\
G_0^{Px}(\omega_2, t_1' \ldots t_{nt'}', z_1', c_{nc}) & G_0^{Px}(\omega_2, t_1' \ldots t_{nt'}', z_2', nc) & \ldots & G_0^{Px}(\omega_2, t_1' \ldots t_{nt'}', z_{nz'}', c_{nc}) \\
\ldots & \ldots & \ldots & \ldots \\
G_0^{Py}(\omega_{n\omega}, t_1' \ldots t_{nt'}', z_1', c_{nc}) & G_0^{Py}(\omega_{n\omega}, t_1' \ldots t_{nt'}', z_2', c_{nc}) & \ldots & G_0^{Py}(\omega_{n\omega}, t_1' \ldots t_{nt'}', z_{nz'}', c_{nc}) \\
G_0^{Py}(\omega_1, t_1' \ldots t_{nt'}', z_1', c_{nc}) & G_0^{Py}(\omega_1, t_1' \ldots t_{nt'}', z_2', c_{nc}) & \ldots & G_0^{Py}(\omega_1, t_1' \ldots t_{nt'}', z_{nz'}', c_{nc}) \\
G_0^{Py}(\omega_2, t_1' \ldots t_{nt'}', z_1', c_{nc}) & G_0^{Py}(\omega_2, t_1' \ldots t_{nt'}', z_2', c_{nc}) & \ldots & G_0^{Py}(\omega_2, t_1' \ldots t_{nt'}', z_{nz'}', c_{nc}) \\
\ldots & \ldots & \ldots & \ldots \\
G_0^{Pz}(\omega_{n\omega}, t_1' \ldots t_{nt'}', z_1', c_{nc}) & G_0^{Pz}(\omega_{n\omega}, t_1' \ldots t_{nt'}', z_2', c_{nc}) & \ldots & G_0^{Pz}(\omega_{n\omega}, t_1' \ldots t_{nt'}', z_{nz'}', c_{nc}) \\
G_0^{Pz}(\omega_1, t_1' \ldots t_{nt'}', z_1', c_{nc}) & G_0^{Pz}(\omega_1, t_1' \ldots t_{nt'}', z_2', c_{nc}) & \ldots & G_0^{Pz}(\omega_1, t_1' \ldots t_{nt'}', z_{nz'}', c_{nc}) \\
G_0^{Pz}(\omega_2, t_1' \ldots t_{nt'}', z_1', c_{nc}) & G_0^{Pz}(\omega_2, t_1' \ldots t_{nt'}', z_2', c_{nc}) & \ldots & G_0^{Pz}(\omega_2, t_1' \ldots t_{nt'}', z_{nz'}', c_{nc}) \\
\ldots & \ldots & \ldots & \ldots \\
G_0^{Pz}(\omega_{n\omega}, t_1' \ldots t_{nt'}', z_1', c_1) & G_0^{Pz}(\omega_{n\omega}, t_1' \ldots t_{nt'}', z_2', c_{nc}) & \ldots & G_0^{Pz}(\omega_{n\omega}, t_1' \ldots t_{nt'}', z_{nz'}', c_{nc})
\end{bmatrix}$$

where the dependency on z (measurement depth), $k_x$ and $k_y$ has been omitted for simplicity.

In the typical marine acquisition, measurement density along each individual cable is sufficient to avoid spatial aliasing along x (inline coordinate, parallel to the cables), and insufficient along y (crossline coordinate, perpendicular with respect to the cables). In one embodiment tailored to such an example, the available wavefield measurements may be Fourier transformed along x, such that the data's inline coordinate axis x and the potential's inline coordinate axis x' may be replaced by an inline wavenumber axis $k_x$. In the wavenumber domain, the estimation of the scattering potential may be carried out independently for each value of the inline wavenumber $k_x$, thereby reducing the size of the system of equations to be numerically solved. In this context independently means the mapping may occur entirely within the subsets of the scattering potential and of the available wavefield measurements characterized by a common individual value of the inline wavenumber $k_x$. For each value of $k_x$, the crossline wavefield reconstruction problem may be formulated based on wavefield synthesis and spectral analysis operators defined as follows:

$$\mathcal{L}_{\substack{y' \to y \\ t', z', c \to \omega, z}}\left(m^{(\overline{k_x})}(t', z', y', c)\right) = \\
\mathcal{F}_{k_y \to y}\left(\mathcal{G}_{t', z', c \to \omega, z}\left(\mathcal{F}_{y' \to k_y}^H\left(m^{(\overline{k_x})}(t', z', y', c)\right)\right)\right),$$

$$\mathcal{L}_{\substack{y \to y' \\ \omega, z \to t', z', c}}^H\left(d^{(\overline{k_x})}(\omega, y, z)\right) = \mathcal{F}_{k_y \to y'}\left(\mathcal{G}_{\omega, z \to t', z', c}^H\left(F_{y \to k_y}^H\left(d^{(\overline{k_x})}(\omega, y, z)\right)\right)\right),$$

where $\mathbf{d}^{(\overline{k_x})}$ indicates that only the subset of the Fourier transformed available wavefield measurements characterized by a fixed value $k_x = \overline{k_x}$ may enter the inverse problem. Similarly, $\mathbf{m}^{(\overline{k_x})}$ indicates that only the subset of the scattering potential samples characterized by a fixed value $k_x = \overline{k_x}$ may be computed.

The coefficients of the scattering potential may be obtained by minimization of some metric of the residual, which may be the difference between the available wavefield measurements and the wavefield synthetized at the measurement locations, within each individual value of the inline wavenumber. In some examples, the solution may be obtained through the least squares method (LS) or the least squares QR factorization (LSQR) algorithm, or the matching pursuit method.

In some embodiments of the present disclosure, the wavefield synthesis and spectral analysis operators $\mathcal{L}()$ and $\mathcal{L}^H()$ may be employed within an inversion scheme exploiting and promoting the sparseness properties of the scattering potential within each individual value of the inline wavenumber $k_x$.

In another embodiment, the operators $\mathcal{G}()$ and $\mathcal{G}^H()$ may be further devised to perform an additional Fourier transform along the scattering potential's depth axis z' and along the measurement's time axis t:

$$\mathcal{G}_{t', z', c \to \omega, z}(m(t', z', k_x, k_y, c)) = \\
\mathcal{S}_{t', k_z, c \to \omega, z}(\mathcal{F}_{z' \to k_z}^H(m(t', z', k_x, k_y, c))),$$

$$\mathcal{G}_{\omega, z \to t', z', c}^H(d(\omega, k_x, k_y, z)) = \\
\mathcal{F}_{k_z \to z}(\mathcal{S}_{\omega, z \to k_{t', z', c}}^H(d(\omega, k_x, k_y, z))).$$

The operators $\mathcal{S}$ and $\mathcal{S}^H$ carry out mapping between the Fourier transformed measurements and the Fourier transformed scattering potential. In this domain, the wavefield synthesis mapping ($\mathcal{S}$) consists in resampling the scattering potential's uniformly sampled $k_z$ axis to the non-uniformly sampled values $\kappa_z$ given by $$\kappa_z = \sqrt{\frac{\omega^2}{c^2} - k_x^2 - k_y^2},$$

and in applying some scalar coefficients (not shown). The spectral analysis mapping consists in resampling the data's uniformly sampled $\omega$ axis to the non-uniformly sampled $\omega$ values defined by $w = c\sqrt{k_x^2 + k_y^2 + k_z^2}$ (a process known as Stolt migration), and applying some scalar coefficients (not shown). Wavefield synthesis and spectral analysis mapping in those forms may provide an increase in computational efficiency with respect to an explicit formulation of the mapping matrices $\mathcal{G}$ and $\mathcal{G}^H$.

In accordance with a number of embodiments of the present disclosure, a geophysical data product may be produced. The geophysical data product may include, for example, a reconstructed wavefield. Geophysical data, such as data previously sampled by seismic receivers, depth sensors, location sensors, etc., may be obtained (e.g., retrieved from a data library) and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, recorded seismic data may be treated according to the present disclosure as the recorded seismic data is sampled and/or measured offshore to facilitate other processing of the seismic data either offshore or onshore. Embodiments of the present disclosure may be used with shallow (e.g., on the order of tens of meters) and/or deep (e.g., on the order of hundreds of meters) water surveys.

Figure 3:
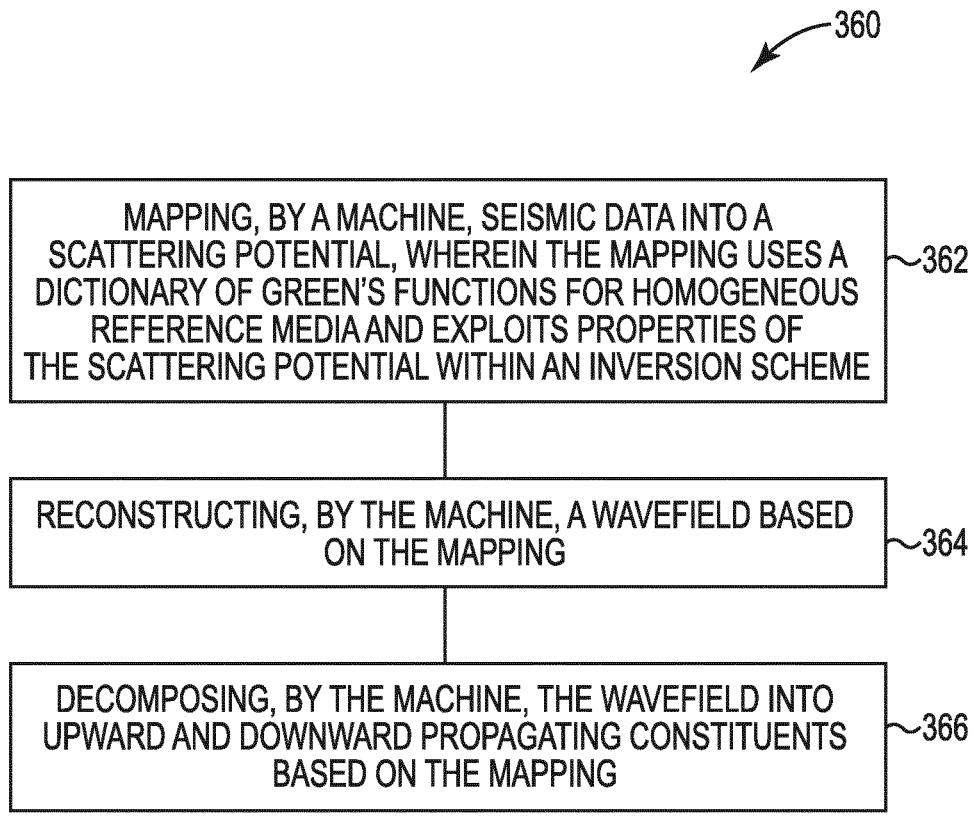
FIG. 3 illustrates a method flow diagram for wavefield reconstruction.

FIG. 3 illustrates a method 360 for wavefield reconstruction. At 362, method 360 includes mapping, by a machine, seismic data into a scattering potential. The seismic data may include data recorded in an individual physical experiment, characterized by an actuation of a seismic source. As used herein, a physical experiment characterized by an actuation of a seismic source comprises actuating a seismic source to gather and/or process seismic data from seismic receivers. The mapping uses a dictionary of Green's functions for a constant wave velocity reference medium and the mapping exploits properties of the scattering potential within an inversion scheme. As used herein, an inversion scheme includes seismic inversion of sampled seismic data. In some examples, the mapping uses a dictionary of an approximation of Green's functions, where spreading losses have been suppressed. As used herein, a dictionary of Green's functions includes a collection of Green's functions, and may be used within a mapping matrix. The dictionary may be approximated by an AASHRT dictionary in at least one embodiment. As used herein, approximated by means the AASHRT dictionary may perform similarly, but not exactly as the dictionary comprising the collection of Green's functions. The inversion scheme may be a sparseness-promoting numerical inversion scheme in a number of embodiments, a least squares scheme, or a weighted least squares scheme, or a matching pursuit scheme. The constant wave velocity reference medium may be bounded or unbounded.

Method 360 may include mapping between available wavefield measurements and the scattering potential, the inversion scheme, and the reconstruction of the wavefield independently for each individual value of a temporal frequency. In another embodiment, method 360 may include mapping between available wavefield measurements and the scattering potential, the sparseness-promoting numerical inversion scheme, and the reconstruction of the wavefield independently for each individual value of an inline wavenumber.

At 364, the method 360 includes reconstructing, by the machine, a wavefield based on the mapping. In some embodiments, the wavefield reconstructed is a 3D wavefield. The mapping and reconstruction may include basis functions, in combination with sparseness promoting techniques to reconstruct and/or interpolate a wavefield.

At 366, the wavefield may be decomposed, by the machine, into its upward and downward propagating constituents based on the mapping. The decomposition may occur at existing seismic receiver locations and/or at location of newly simulated virtual cables or at entirely new locations, such as on a uniform grid.

Figure 4:
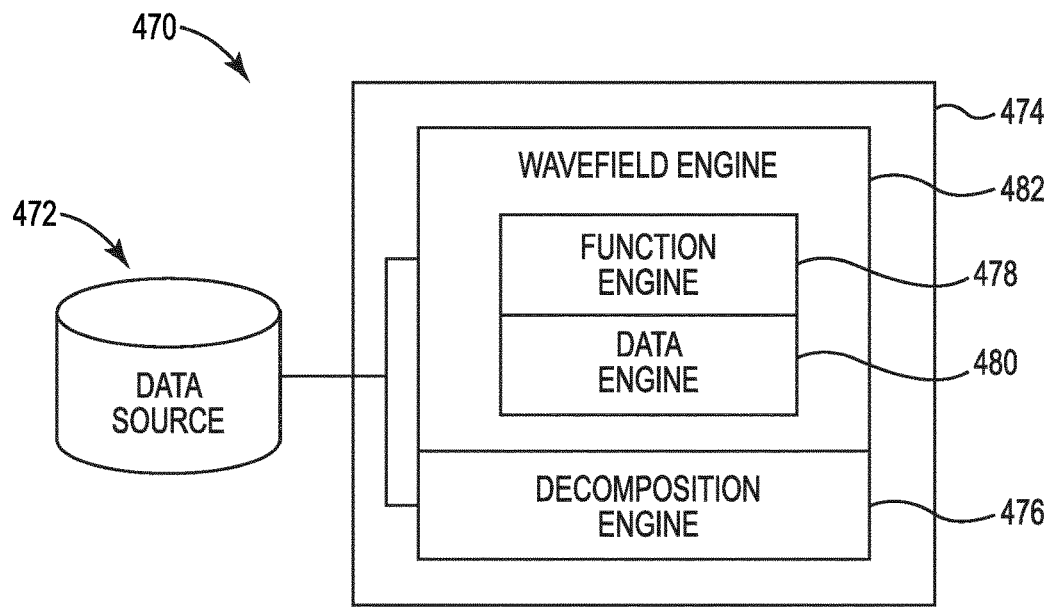
FIG. 4 illustrates a diagram of a system for wavefield reconstruction.

FIG. 4 illustrates a diagram of a system for wavefield reconstruction. The system 470 may include a data source 472, a subsystem 474, and/or a number of engines (e.g., decomposition engine 476, function engine 478, data engine 480, and/or wavefield engine 482) and may be in communication with the data source 472 (or data store) via a communication link. The system 470 may include additional or fewer engines than illustrated to perform the various functions described herein. The system may represent program instructions and/or hardware of a machine (e.g., machine 584 as referenced in FIG. 5, etc.). As used herein, an "engine" may include program instructions and/or hardware, but at least includes hardware. Hardware is a physical component of a machine that enables it to perform a function. Examples of hardware may include a processing resource, a memory resource, a logic gate, etc.

The number of engines may include a combination of hardware and program instructions that is configured to perform a number of functions described herein. The program instructions, such as software, firmware, etc., may be stored in a memory resource such as a machine-readable medium, as well as hard-wired program such as logic. Hard-wired program instructions may be considered as both program instructions and hardware.

Wavefield engine 482 may include a combination of hardware and program instructions that is configured to reconstruct a wavefield. In at least one embodiment, the wavefield reconstruction occurs at locations inside an area covered by available wavefield measurements, and in another embodiment, the wavefield reconstruction occurs at newly simulated virtual cable locations outside an area covered by available wavefield measurements, or at entirely new locations, such as on a uniform grid. Wavefield engine 482 may comprise a function engine 478 and a data engine 480. In some embodiments, the function engine 478 may include a combination of hardware and program instructions that is configured to map seismic data into a scattering potential using a dictionary composed of at least one of Green's functions for homogeneous reference media and AASHRT functions and exploit properties of the scattering potential within an inversion scheme. The seismic data may include data recorded in a physical experiment characterized by an actuation of a plurality of seismic sources and may include measurements uniformly distributed in space or non-uniformly distributed in space. The seismic data may include measurements of physical properties related to the wavefield, for instance pressure, pressure's spatial gradients, particle velocity, and/or acceleration.

The function engine 478 may be configured to map the seismic data independently for each of a temporal frequency and inline wavenumber. In at least one example, the function engine 478 may be configured to describe, via the dictionary, wave propagation in homogeneous whole-space or half-space reference media between a first point in the subsurface, associated with the scattering potential, and a second point, associated with the sampled data. In another example, the function engine 478 may be configured to describe wave propagation in homogeneous whole-space or half-space reference media between a first point, associated with the scattering potential, and a second point, where the reconstructed wavefield is desired.

In a number of embodiments, the data engine 480 may include a combination of hardware and program instructions to reconstruct the wavefield based on the mapped seismic data and exploited properties of the scattering potential. For instance, the data engine 480 may be configured to perform the operations associated with the present disclosure, comprising the spectral analysis and wavefield synthesis, and reconstruct the wavefield based on the available wavefield measurements and the dictionary in combination with the function engine. The data engine 480, in some embodiments, may apply a sparseness-promoting linear solver or a weighted least squares solver to obtain the reconstructed synthetic seismic data. As used herein, synthetic seismic data is newly created seismic data.

Data engine 480 may comprise an analysis engine (not shown) to describe wave propagation between scattering points and available wavefield measurements locations and a synthesis engine (not shown) to describe wave propagation between scattering points and desired spatial locations of reconstructed wavefields. As used herein an available wavefield measurements location is a location from which seismic data is available for sampling. Propagation between scattering points and available wavefield measurements locations or desired spatial locations includes oscillation between the points and locations. Scattering points, as used herein include points within a scattering potential.

Decomposition engine 476 may include a combination of hardware and program instructions to decompose the reconstructed wavefield into upward and downward propagating constituents based on the mapping. In some embodiments, wavefield reconstruction and wavefield decomposition may be coupled and simultaneous. For instance, the wavefield may be simultaneously decomposed and reconstructed. Put another way, decomposition engine 476 and wavefield engine 482 may be configured to act simultaneously. In at least one embodiment, the decomposition occurs at available wavefield measurements locations, and in another embodiment, the decomposition occurs at newly simulated virtual cable locations besides the available ones or at entirely new locations, such as on a uniform grid.

Figure 5:
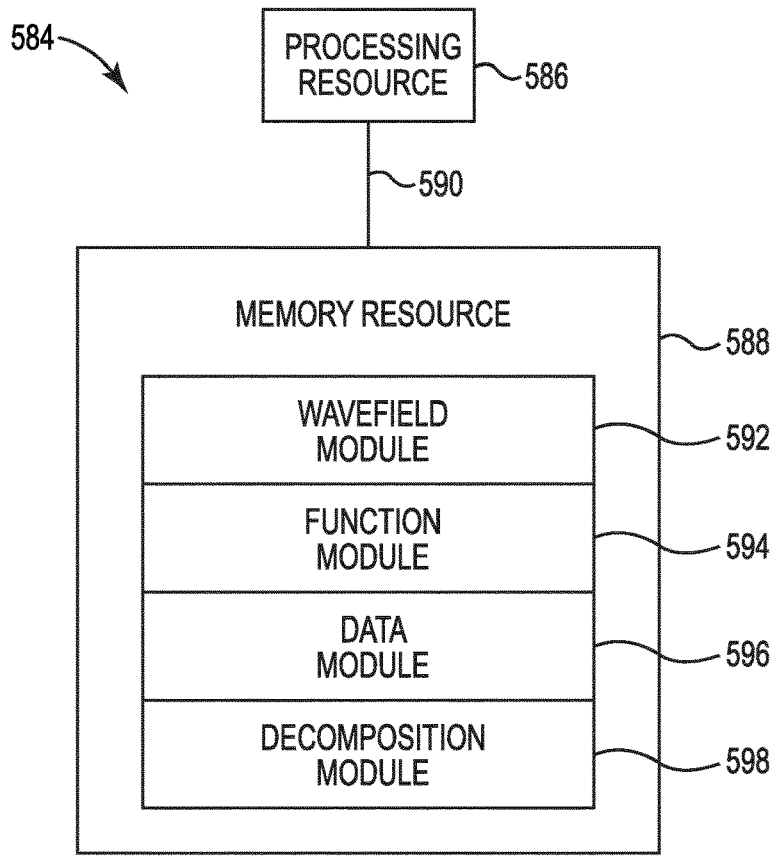
FIG. 5 illustrates a diagram of a machine for wavefield reconstruction.

FIG. 5 illustrates a diagram of a machine 584 for wavefield reconstruction. The machine 584 may utilize software, hardware, firmware, and/or logic to perform a number of functions. The machine 584 may be a combination of hardware and program instructions configured to perform a number of functions. The hardware, for example, may include a number of processing resources 586 and a number of memory resources 588, such as a machine-readable medium or other memory resources 588. The memory resources 588 may be internal and/or external to the machine 584, for example, the machine 584 may include internal memory resources and have access to external memory resources. The program instructions, such as machine-readable instructions, may include instructions stored on the machine-readable medium to implement a particular function, for example, an action such as reconstructing a wavefield. The set of machine-readable instructions may be executable by one or more of the processing resources 586. The memory resources 588 may be coupled to the machine 584 in a wired and/or wireless manner. For example, the memory resources 588 may be an internal memory, a portable memory, a portable disk, and/or a memory associated with another resource, for example, enabling machine-readable instructions to be transferred and/or executed across a network such as the Internet. As used herein, a "module" may include program instructions and/or hardware, but at least includes program instructions.

Memory resources 588 may be non-transitory and may include volatile and/or non-volatile memory. Volatile memory may include memory that depends upon power to store information, such as various types of dynamic random access memory among others. Non-volatile memory may include memory that does not depend upon power to store information. Examples of non-volatile memory may include solid state reference media such as flash memory, electrically erasable programmable read-only memory, phase change random access memory, magnetic memory, optical memory, and/or a solid state drive, etc., as well as other types of non-transitory machine-readable media.

The processing resources 586 may be coupled to the memory resources 588 via a communication path 590. The communication path 590 may be local or remote to the machine 584. Examples of a local communication path 590 may include an electronic bus internal to a machine, where the memory resources 588 are in communication with the processing resources 586 via the electronic bus. Examples of such electronic buses may include Industry Standard Architecture, Peripheral Component Interconnect, Advanced Technology Attachment, Small Computer System Interface, Universal Serial Bus, among other types of electronic buses and variants thereof. The communication path 590 may be such that the memory resources 588 are remote from the processing resources 586, such as in a network connection between the memory resources 588 and the processing resources 586. That is, the communication path 590 may be a network connection. Examples of such a network connection may include a local area network, wide area network, personal area network, and the Internet, among others.

As shown in FIG. 5, the machine-readable instructions stored in the memory resources 588 may be segmented into a number of modules 592, 594, 596, 598 that when executed by the processing resources 586 may perform a number of functions. As used herein a module includes a set of instructions included to perform a particular task or action. The number of modules 592, 594, 596, 598 may be sub-modules of other modules. For example, the function module 594 may be a sub-module of the wavefield module 592 and/or the data module 596 and the function module 594 may be contained within a single module. Furthermore, the number of modules 592, 594, 596, 598 may comprise individual modules separate and distinct from one another. Examples are not limited to the specific modules 592, 594, 596, 598 illustrated in FIG. 5.

Each of the number of modules 592, 594, 596, 598 may include program instructions and/or a combination of hardware and program instructions that, when executed by a processing resource 586, may function as a corresponding engine as described with respect to FIG. 4. For example, the wavefield module 592 may include program instructions and/or a combination of hardware and program instructions that, when executed by a processing resource 586, may function as the wavefield engine 482, the function module 594 may include program instructions and/or a combination of hardware and program instructions that, when executed by a processing resource 586, may function as the function engine 478, the data module 596 may include program instructions and/or a combination of hardware and program instructions that, when executed by a processing resource 586, may function as the data engine 480, and/or the decomposition module 598 may include program instructions and/or a combination of hardware and program instructions that, when executed by a processing resource 586, may function as the decomposition engine 476.

Data module 596 may include instructions executable to sample seismic data measured by a seismic receiver. Function module 594 may include instructions executable to interpolate the sampled data using a dictionary, such as a Green's function dictionary or an AASHRT dictionary, and the machine 584 may include a data module 596, which may include instructions executable to generate synthetic seismic data at locations associated with a virtual cable among the plurality of cables based on the interpolated data.

The machine 584 may also include a wavefield module 592, which may include instructions executable to reconstruct a wavefield associated with the virtual cable based on the interpolated data. Wavefield module 592 may also include instructions executable to reconstruct a wavefield at a location away from a seismic receiver based on seismic data sampled from the seismic receiver, a vector of model coefficients comprising a scattering potential, and at least one of a mapping matrix comprising a dictionary of Green's functions and an operator defined by a combination of a number of functions. As used herein, a location away from the seismic receiver is a location capable of hosting a reconstructed wavefield that is not located on a host of the seismic receiver from which the sampled seismic data originated. In at least one embodiment, this is a location away from a cable, such that the location is capable of hosting a reconstructed wavefield that is not located on the cable hosting the seismic receiver from which the sampled seismic data originated. In another embodiment, a virtual cable is modeled that comprising a virtual seismic receiver at the location away from the seismic receiver. The scattering potential may be an equivalent source distribution. As used herein, the vector of model coefficients may include a vector of model coefficients for use in wavefield reconstruction. The mapping matrix may include a representation of linear functions for use in wavefield reconstruction, among other matrices.

The machine 584 may also include a module or modules (not shown) including instructions to sample non-uniform and/or coarsely sampled seismic data from a seismic receiver and reconstruct a wavefield at a particular location based on the sampled data, a mapping matrix or operator including a combination of a number of functions, and a vector of model coefficients. The combination of a number of functions, as used herein, includes a combination of the aforementioned functions. For instance, a combination of the functions described with the discussion of FIGS. 1 and 2. In some embodiments, the instructions may be executable to reconstruct the wavefield using a basis function within a Green's function dictionary. Decomposition module 598 may include instructions executable to decompose the wavefield into upward and downward propagating constituents.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Various advantages of the present disclosure have been described herein, but embodiments may provide some, all, or none of such advantages, or may provide other advantages.

The invention claimed is:

1. A system, comprising:
a data source;
a wavefield engine comprising:
a function engine to:
map seismic data stored in the data source into a scattering potential using a dictionary composed of at least one of Green's functions for homogeneous reference media or Asymptote and Apex-Shifted Hyperbolic Radon Transform (AASHRT) functions; and
map the seismic data independently for at least one of a temporal frequency and inline wavenumber;
a data engine to:
create a simulated linear array of seismic receivers; and
reconstruct the wavefield based on synthetic seismic data associated with the simulated linear array and exploited properties of the scattering potential within an inversion scheme; and
a decomposition engine to decompose the wavefield into upward and downward propagating constituents based on the mapping and the reconstructed wavefield.

2. The system of claim 1, further comprising the data engine to apply a sparseness-promoting numerical solver to generate the synthetic seismic data while exploiting properties of the mapped seismic data.

3. The system of claim 1, wherein the data engine comprises:
an analysis engine to describe wave propagation between scattering points and available wavefield measurements locations; and
a synthesis engine to describe wave propagation between scattering points and desired spatial locations of reconstructed wavefields.

4. The system of claim 1, wherein the seismic data comprises data recorded in a physical experiment characterized by an actuation of a plurality of seismic sources.

5. The system of claim 1, wherein the seismic data comprises measurements uniformly distributed in space.

6. The system of claim 1, wherein the seismic data comprises measurements non-uniformly distributed in space.

7. The system of claim 1, wherein the seismic data comprises measurements of physical properties related to the wavefield.

8. A non-transitory machine-readable medium storing instructions executable by a processing resource to:
increase a density of wavefield measurements by creating a simulated linear array of seismic receivers between two streamers of a marine seismic survey;
reconstruct a wavefield at a location away from a seismic receiver of the marine seismic survey based on seismic data sampled from the seismic receiver, synthetic seismic data associated with the simulated linear array, a vector of model coefficients comprising a scattering potential, and at least one of a mapping matrix comprising a dictionary of Green's functions or an operator defined by a combination of a number of functions.

9. The medium of claim 8, wherein the scattering potential is an equivalent source distribution.

10. The medium of claim 8, wherein the instructions executable to reconstruct a wavefield comprise instructions executable to reconstruct synthetic measurements at locations inside an area covered by available wavefield measurements.

11. The medium of claim 8, wherein the instructions executable to reconstruct a wavefield comprise instructions executable to reconstruct synthetic measurements at available wavefield measurements locations.

12. The medium of claim 8, wherein the instructions executable to reconstruct a wavefield comprise instructions executable to reconstruct synthetic measurements at locations outside an area covered by available wavefield measurements.

13. The medium of claim 8, including instructions executable to model a virtual cable including a virtual seismic receiver at the location away from the seismic receiver.

14. A method, comprising:
mapping, by a machine, seismic data into a scattering potential,
wherein the mapping uses a dictionary of Green's functions for homogeneous reference media and exploits properties of the scattering potential within an inversion scheme;
creating, by the machine, a simulated linear array of seismic receivers that increases a density of wavefield measurements associated with the seismic data;
reconstructing, by the machine, a wavefield based on synthetic seismic data associated with the simulated array; and
decomposing, by the machine, the wavefield into upward and downward propagating constituents based on the mapping and the reconstructed wavefield.

15. The method of claim 14, wherein the homogeneous reference media is bounded.

16. The method of claim 14, wherein the homogeneous reference media is unbounded.

17. The method of claim 14, wherein the inversion scheme is at least one of a sparseness-promoting numerical inversion scheme, a least squares scheme, and a weighted least squares scheme.

18. The method of claim 17, comprising mapping between available wavefield measurements and the scattering potential, the inversion scheme, and the reconstruction of the wavefield independently for each individual value of a temporal frequency.

19. The method of claim 17, comprising mapping between available wavefield measurements and the scattering potential, the sparseness-promoting numerical inversion scheme, and the reconstruction of wavefield independently for each individual value of an inline wavenumber.

20. The method of claim 14, wherein the dictionary is approximated by an Asymptote and Apex-Shifted Hyperbolic Radon dictionary.

21. The method of claim 14, further comprising:
generating a geophysical data product from at least one of the seismic data, the wavefield based on the mapping, and the upward and downward propagating constituents.

22. The method of claim 21, further comprising recording the geophysical data product on a non-transitory machine-readable medium suitable for importing onshore.

23. The method of claim 21, wherein processing the geophysical data comprises processing the geophysical data offshore or onshore.

* * * * *